US012330877B2

(12) United States Patent
Cristoforetti

(10) Patent No.: US 12,330,877 B2
(45) Date of Patent: Jun. 17, 2025

(54) CURVED BELT CONVEYOR

(71) Applicant: MECHANICA SISTEMI S.R.L., Paderno Dugnano (IT)

(72) Inventor: Giorgio Cristoforetti, Varese (IT)

(73) Assignee: MECHANICA SISTEMI S.R.L., Paderno Dugnano (IT)

(*) Notice: Subject to any disclaimer, the term of this patent is extended or adjusted under 35 U.S.C. 154(b) by 86 days.

(21) Appl. No.: 18/173,439

(22) Filed: Feb. 23, 2023

(65) Prior Publication Data

US 2023/0278803 A1   Sep. 7, 2023

(30) Foreign Application Priority Data

Mar. 1, 2022   (IT) .................. 102022000003830

(51) Int. Cl.
*B65G 15/02* (2006.01)
*B65G 15/30* (2006.01)
*B65G 21/16* (2006.01)

(52) U.S. Cl.
CPC ............ *B65G 15/02* (2013.01); *B65G 15/30* (2013.01); *B65G 21/16* (2013.01); *B65G 2812/02168* (2013.01)

(58) Field of Classification Search
None
See application file for complete search history.

(56) References Cited

U.S. PATENT DOCUMENTS 7,232,030 B2   6/2007   Duncan et al.
8,167,121 B2 *  5/2012   Yuasa ............... B65G 15/02
                                              198/837
9,120,628 B2   9/2015   Ventz et al.
10,392,191 B1   8/2019   King

FOREIGN PATENT DOCUMENTS

| EP | 0716034 A1 | 6/1996 |
| JP | 5-24622 A | 2/1993 |
| JP | 5-286537 A | 11/1993 |
| KR | 10-2017-0030390 A | 3/2017 |
| WO | WO-2024177498 A1 * | 8/2024 |

OTHER PUBLICATIONS

Early Search Report in Italian Patent Application No. 102022000003830, dated Oct. 14, 2022.

* cited by examiner

*Primary Examiner* — William R Harp
(74) *Attorney, Agent, or Firm* — Jones Robb, PLLC

(57) ABSTRACT

A curved belt conveyor includes a conveyor belt with a hooking element associated with an outer periphery of the conveyor belt and multiple pairs of rollers guiding the hooking element. A plurality of supporting elements is placed at the outer periphery, each for supporting at least one pair of rollers. A holding space for the hooking element is defined among each pair of rollers and a corresponding supporting element. A main roller of one of the pairs of rollers is movable along a trajectory extending along a longitudinal development of a corresponding main roller shaft between a releasing position, wherein the rollers are spaced to define an intermediate space therebetween to allow the passage of the hooking element, and a retaining position, wherein the rollers are close to each other to prevent passage of the hooking element from the corresponding holding space through the corresponding intermediate space.

23 Claims, 20 Drawing Sheets

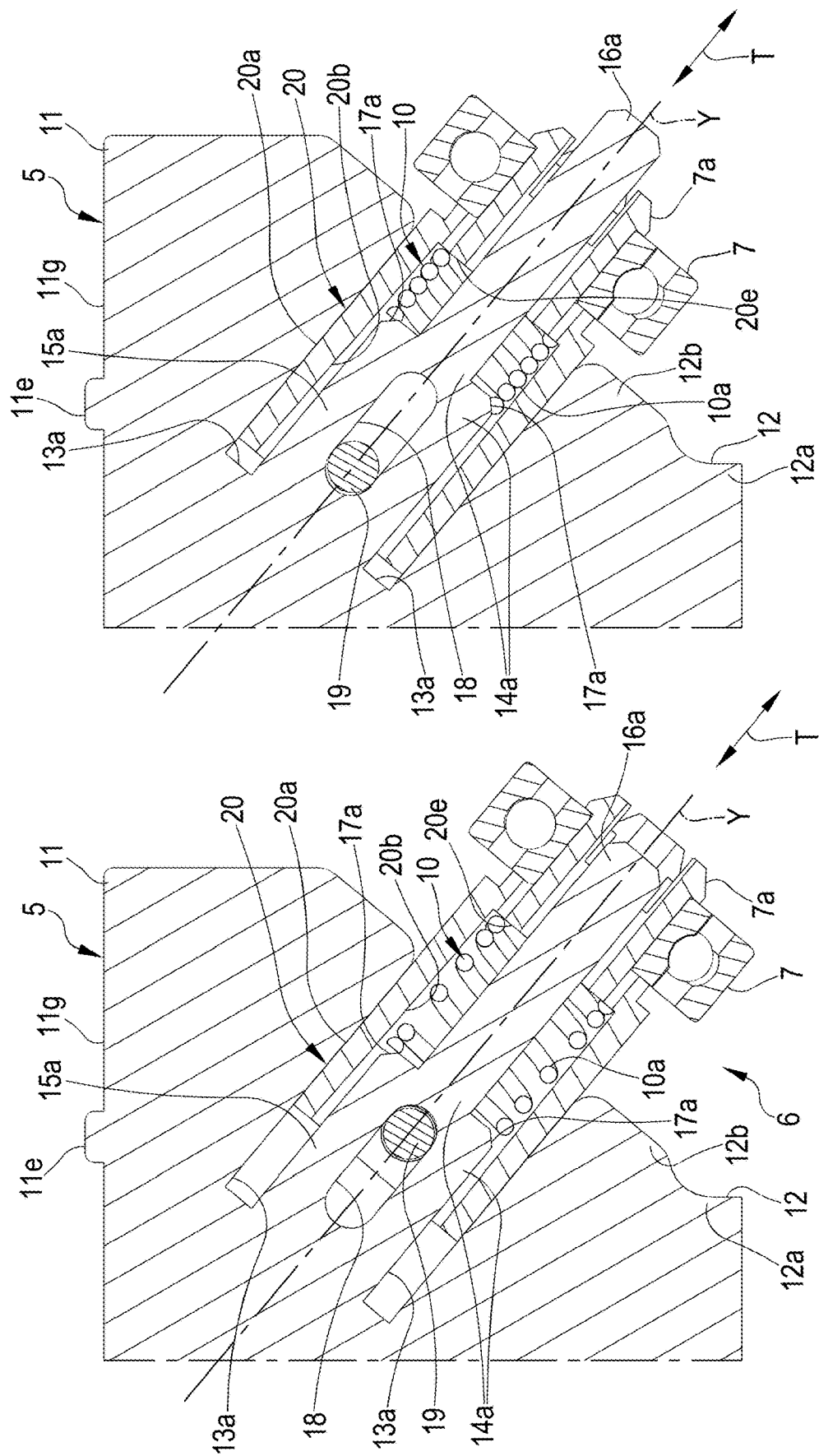

CURVED BELT CONVEYOR

CROSS-REFERENCE TO RELATED APPLICATIONS

This application claims priority to Italian Patent Application No. 102022000003830, filed on Mar. 1, 2022, the entire content of which is incorporated by reference herein.

BACKGROUND

The present invention relates to a curved belt conveyor.

In particular, the object of the present invention can be used in the industrial field of machines and/or apparatuses for moving and/or sorting objects like boxes or packages that have to be managed, shipped and/or delivered, as for example by logistics and shipping companies, and/or luggage and suitcases to be loaded or unloaded on/from airplanes, ships, trains and/or other means of transport.

In particular, the present invention refers to a curved belt conveyor which can be part of one a more complex machine having different belt conveyors properly connected together to define one or more advancing paths for the objects to be moved.

As disclosed within U.S. Pat. No. 9,120,628 a curved belt conveyor comprises a frame and deflection rollers which a conveyor belt revolves on and around. On a side wall profile, the curved belt conveyor is provided with a plurality of gripping rollers which engage a hooking element arranged on the outer edge of the conveyor belt so that to guide the conveyor belt during its running movement around the deflection rollers.

The gripping rollers are distributed along the outer edge of the conveyor belt according to groups of four gripping rollers, paired two by two, and properly arranged one over another. Each group of four gripping rollers are supported by a corresponding supporting element comprising a U-shaped profile having a central portion from which two opposed wings develop at right-angles parallel to one another.

Each supporting element is placed at the corresponding side wall of the curved belt conveyor in order to allow the corresponding gripping rollers to hold the hooking element of the conveyor belt tensioning this latter during its revolving movement. In particular, the hooking element of the belt conveyor is guided between the gripping rollers of each couple of gripping rollers of the corresponding supporting elements.

The gripping rollers of each couple of gripping rollers are inclined one with respect to the other so as to act on the hooking element of the conveyor belt from both sides.

Each gripping roller is mounted on a corresponding roller holder, which is received in turn in the corresponding supporting element, between the opposed wings of the U-shaped profile. In order to be able to take the conveyor belt and in particular the hooking element out from the position between the corresponding gripping rollers, one gripping roller of each couple of gripping rollers is pivotably arranged.

In particular, each pivotable gripping roller of each couple of gripping rollers can be rotated around a corresponding rotating axis developing orthogonal to the opposed wings of the corresponding U-shaped profile of the corresponding supporting element between a retaining position, wherein the gripping rollers of corresponding couple of gripping rollers are close to each other to keep and guide the hooking element of the conveyor belt between them, and a releasing position, wherein the gripping rollers of the corresponding couple of gripping rollers are distant one from the other so that to allow the hooking element of the conveyor belt to disengage the gripping rollers.

In order to fix the retaining position or the releasing position of each pivotable gripping roller of each couple of gripping rollers, a plurality of detent recesses are provided in the opposed wings of the U-shaped profile of the corresponding supporting element for cooperating with at least one detent nose provided on the corresponding roller holder.

The rotation movement of each pivotable gripping roller from the retaining position to the releasing position is executed by rotationally moving such pivotable gripping roller upwards and towards the inner edge of the conveyor belt, namely substantially towards a disengagement direction of the hooking element of the conveyor belt.

In order to get stuck the hooking element in the guiding position between the gripping rollers of a corresponding couple of gripping rollers, the pivotable gripping roller is rotationally moved from the releasing position to the retaining position downwards and towards away from the inner edge of the conveyor belt, contrary to the disengagement direction of the hooking element thereof.

U.S. Pat. No. 7,232,030 discloses a quick release holder attached to a conveyor frame. The holder grips a conveyor belt's beading and can be manually pivoted to release the beading and free the belt. In particular a mounting bracket is attached to the conveyor frame and a pivoting bracket is connected to the mounting bracket.

A first gripping roller extends from the mounting bracket to grip the beading, and similarly, a second gripping roller extends from the pivoting bracket to grip the beading.

Until the holder is secured to the beading, the pivoting bracket's gripping roller can be moved either towards or away from the other gripping roller between a retaining position wherein the gripping rollers keep tightly the beading secured between them and a releasing position wherein the beading can be disengaged from the gripping rollers. Different types of means can be used to clip securely the pivoting bracket against the mounting bracket to ensure the retaining position.

Also in this case, the rotation movement of each pivoting bracket and the corresponding gripping roller from the retaining position to the releasing position is executed by rotationally moving such gripping roller upwards and towards the inner edge of the conveyor belt, i.e. substantially towards a disengagement direction of the beading of the conveyor belt.

In order to grip the hooking element in the guiding position between the gripping rollers, the pivoting bracket and the corresponding gripping roller are rotationally moved from the releasing position to the retaining position downwards and towards away from the inner edge of the conveyor belt, contrary to the disengagement direction of the conveyor belt's beading.

U.S. Pat. No. 10,392,191 refers to a rapid release mechanism for a curved belt conveyor, comprising: a frame; a drive pulley connected to the frame; a tail pulley connected to the frame; a conveyor belt revolved around the drive pulley and the tail pulley; a beading fitted to the outer boundary of the conveyor belt; a plurality of gripping rollers to guide the beading of the conveyor belt, two by two coupled; a plurality of closed-ended C-shaped structural pillars connected at one side of the frame; a plurality of roller holders, each holding a corresponding gripping roller; at least one latch active on each roller holder to engage the corresponding roller holder to the closed-ended C-shaped structural pillar.

At least one gripping roller of a corresponding couple of gripping rollers of each closed-ended C-shaped structural pillar is pivotable until the gripping roller no longer contacts the beading of the conveyor belt, defining a releasing position wherein the conveyor belt's beading can be disengaged from the couple of gripping rollers.

In order to grip the conveyor belt's beading and guide this latter during the revolving motion of the belt between the corresponding gripping rollers, the aforementioned pivotable gripping roller of the corresponding couple of gripping rollers is pivoted until contacting the beading which is kept clamped between the corresponding gripping rollers. When the conveyor belt's beading is clamped between the corresponding gripping rollers, the retaining position is defined.

Unlike the solutions disclosed in U.S. Pat. No. 9,120,628 and in U.S. Pat. No. 7,232,030, the solution disclosed in U.S. Ser. No. 10/392,191 teaches that the rotation movement of each pivotable gripping roller from the retaining position to the releasing position to allow the conveyor belt's beading to be disengaged from the corresponding gripping rollers is executed by rotationally moving such pivotable gripping roller upwards and away from the inner edge of the conveyor belt, namely contrary the disengagement direction of the beading of the conveyor belt.

The rotation movement of each pivotable gripping roller from the releasing position to the retaining position to clamp the conveyor belt's beading tensioning the corresponding belt is executed by rotationally moving such pivotable gripping roller downwards and towards the inner edge of the conveyor belt, namely at the same direction of the disengagement direction of the beading of the conveyor belt.

There are some drawbacks and limitations on the conveyors described in the prior art.

In particular, the above known solutions require significant time and dismantling for effective maintenance work especially when the conveyor belt needs to be disassembled either to be replaced with a new belt conveyor or to be repaired when it is damaged.

Furthermore, the prior art solutions are complex and expensive.

SUMMARY

It is an objective of the present invention to reduce significantly the time required for any maintenance and/or any dismantling operation of the curved belt conveyor, especially with reference to the elements adapted to keep the belt conveyor taut.

It is also an objective of the present invention to make easier any assembling and/or disassembling operation of the belt conveyor of the curved belt conveyor.

It is further an objective of the present invention to simplify any maintenance, dismantling, assembling and/or disassembling operation of the belt, especially with reference to curved belt conveyors.

It is another objective of the present invention to reduce the curved belt conveyor downtime as well as to reduce the operating and maintenance costs.

In light of the disclosure set forth herein, and without limiting the disclosure in any way, in a first aspect, which may be combined with any other aspect or portion thereof described herein, a curved belt conveyor comprises: a conveyor belt comprising a hooking element associated with an outer periphery of the conveyor belt; a plurality of pair of rollers guiding the hooking element of the conveyor belt; a plurality of supporting elements placed in correspondence of the outer periphery of the conveyor belt each for supporting at least one pair of rollers, at least a holding space for the hooking element of the conveyor belt being defined among each pair of rollers and the corresponding supporting element; wherein at least one main roller of at least one pair of rollers of each supporting element is movable along a trajectory extending along a longitudinal development of a corresponding main roller shaft between a releasing position, wherein the rollers are distant from each other defining a corresponding intermediate space allowing passage of the hooking element of the conveyor belt to and/or from the corresponding holding space, and a retaining position, wherein the rollers of the corresponding pair of roller are close to each other so that the corresponding intermediate space does not allow the passage of the hooking element of the conveyor belt at least from the corresponding holding space through the corresponding intermediate space.

In a further independent aspect, a curved belt conveyor comprises: a conveyor belt comprising a hooking element associated with an outer periphery of the conveyor belt; a plurality of pair of rollers guiding the hooking element of the conveyor belt; a plurality of supporting elements placed in correspondence of the outer periphery of the conveyor belt each for supporting at least one pair of rollers, at least a holding space for the hooking element of the conveyor belt being defined among each pair of rollers and the corresponding supporting element; wherein each supporting element comprises a plate-like structure aligned to corresponding longitudinal axis of the rollers of the corresponding pair of rollers, the plate-like structure of each supporting element being placed and lying on a median plane of each roller of the corresponding pair of rollers; at least one main roller of at least one pair of rollers of each supporting element is movable along a trajectory between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow passage of the hooking element of the conveyor belt at least from the corresponding holding space through the corresponding intermediate space; the trajectory substantially lying on the median plane of each roller and being in particular either rectilinear or curved, for example an arc of a circle.

In one more independent aspect, a curved belt conveyor comprises: a conveyor belt comprising a hooking element associated with an outer periphery of the conveyor belt; a plurality of pair of rollers guiding the hooking element of the conveyor belt; a plurality of supporting elements placed in correspondence of the outer periphery of the conveyor belt each for supporting at least one pair of rollers, at least a holding space for the hooking element of the conveyor belt being defined among each pair of rollers and the corresponding supporting element; wherein at least one main roller of at least one pair of rollers of each supporting element is movable along a rectilinear trajectory extending along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, and wherein the movement from of the main roller from the retaining position to the releasing position is defined by a rectilinear translation of the main roller along the corresponding longitudinal axis approaching the corresponding supporting element and moving away from the longitudinal axis of the other roller of the corresponding pair of rollers, whereas movement of the main roller from the releasing position to the retaining position is defined by rectilinear translation along the corresponding longitudinal axis, in an opposite direction, moving away from the corresponding supporting element and approaching the longitudinal axis of the other roller of the corresponding pair of rollers.

In a further independent aspect, a curved belt conveyor comprise: a conveyor belt comprising a hooking element associated with an outer periphery of the conveyor belt; a plurality of pair of rollers guiding the hooking element of the conveyor belt; a plurality of supporting elements placed in correspondence of the outer periphery of the conveyor belt each for supporting at least one pair of rollers, at least a holding space for the hooking element of the conveyor belt being defined among each pair of rollers and the corresponding supporting element; wherein at least one main roller of at least one pair of rollers of each supporting element is movable along a rectilinear trajectory extending along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, the main roller of the pair of rollers being able to automatic move from the releasing position to the retaining position under the effect of a pushing force towards the retaining position when no forces are applied to the main roller directed to the releasing position or one or more forces applied to the main roller towards the releasing position are lower than the pushing force.

In an additional independent aspect, a retaining element for a curved belt conveyor comprises: at least one pair of rollers for guiding a hooking element of a conveyor belt; a supporting element for supporting the at least one pair of rollers, at least a holding space for the hooking element of the conveyor belt being defined among the at least one pair of rollers and the supporting element; wherein at least one main roller of at least one pair of rollers is movable along a trajectory extending along a rotation axis of the main roller, in particular also extending along a longitudinal development of a main roller shaft, between a releasing position, wherein the rollers are distant from each other defining a corresponding intermediate space allowing passage of the hooking element of the conveyor belt to and/or from the corresponding holding space, and a retaining position, wherein the rollers are close to each other so that the corresponding intermediate space does not allow passage of the hooking element of the conveyor belt at least from the corresponding holding space through the corresponding intermediate space.

In another independent aspect, a retaining element for a curved belt conveyor is provided comprising: at least one pair of rollers for guiding a hooking element of a conveyor belt; a supporting element for supporting the at least one pair of rollers, at least a holding space for the hooking element of the conveyor belt being defined among the at least one pair of rollers and the supporting element; wherein the supporting element comprises a plate-like structure aligned to corresponding longitudinal axis of the rollers of the corresponding pair of rollers, the plate-like structure being placed and lying on a median plane of each roller of the at least one pair of rollers; at least one main roller of at least one pair of rollers is movable along a trajectory between a releasing position, wherein the rollers are distant from each other defining a corresponding intermediate space allowing passage of the hooking element of the conveyor belt to and/or from the corresponding holding space, and a retaining position, wherein the rollers are close to each other so that the corresponding intermediate space does not allow passage of the hooking element of the conveyor belt at least from the corresponding holding space through the corresponding intermediate space; the trajectory substantially lying on the median plane of each roller and being in particular either rectilinear or curved, for example an arc of a circle.

In the following aspects details are added with regard to both the curved belt conveyor and the retaining element, in particular with regard to the rollers, supporting element and trajectory of the rollers. Each and every aspect relating to the components of the retaining element are also clearly combinable with the above two independent aspects directed to the retaining element.

In a second aspect according to previous aspect, the main roller of the corresponding pair of rollers of each supporting element avoids the hooking element of the conveyor belt to move from the corresponding holding space through the corresponding intermediate space when such main roller is placed at the retaining position.

In a third aspect according to any one of the previous aspects, the main roller of the corresponding pair of rollers of each supporting element is placed at the retaining position, opposes any movement of the hooking element of the conveyor belt from the corresponding holding space through the corresponding intermediate space.

In a fourth aspect according to one or more of the previous aspects, the trajectory of the movement of the main roller of the corresponding pair of rollers of each supporting element between the releasing position and the retaining position is inclined with respect to a longitudinal axis of an auxiliary roller of the same pair of rollers, optionally the main roller of the corresponding pair of rollers of each supporting element converging to the longitudinal axis of the corresponding auxiliary roller of the same pair of rollers from the releasing position to the retaining position.

In a fifth aspect according to one or more of the previous aspects, the trajectory of the movement of the main roller of the corresponding pair of rollers of each supporting element between the releasing position and the retaining position is not a rotation or a pivotable movement around a rotational axis.

In a sixth aspect according to one or more of the previous aspects, the trajectory of the movement of the main roller of the corresponding pair of rollers of each supporting element between the releasing position and the retaining position is substantially rectilinear.

In a seventh aspect according to one or more of the first five aspects, the trajectory of the movement of the main roller of the corresponding pair of rollers of each supporting element between the releasing position and the retaining position is substantially curvilinear.

In an eighth aspect according to any one of the previous aspects, the main roller of the corresponding pair of rollers of each supporting element is provided with at least one elastic element adapted to move the main roller towards the retaining position.

In a ninth aspect according to the previous aspect, the elastic element is operatively interposed between the main roller of the corresponding pair of rollers of each supporting element and the corresponding supporting element, optionally the elastic element opposing the movement of the main roller of the corresponding pair of rollers of each supporting element from the retaining position to the releasing position and pushing the main roller of the corresponding pair of rollers of each supporting element from the releasing position to the retaining position when no force towards the releasing position is applied on the corresponding main roller or no force equal or higher than the push of the elastic element towards the releasing position is applied on the corresponding main roller.

In a tenth aspect according to any one of the previous two aspects, the elastic element comprises at least one spring, particularly a coil spring.

In a eleventh aspect according to any one of the previous aspects, each supporting element comprises a plate-like structure.

In a twelfth aspect according to the previous aspect, the plate-like structure of each supporting element is made in one piece.

In a thirteenth aspect according to the eleventh aspect, the plate-like structure of each supporting element is made by two or more plates joined together, optionally according to a superimposed relation so that to form a single body.

In a fourteenth aspect according to any one of the previous three aspects, the plate-like structure of each supporting element is aligned to corresponding longitudinal axis of the rollers of the corresponding pair of rollers, optionally the plate-like structure of each supporting element is placed and/or lies at a median plane of each roller of the corresponding pair of rollers.

In a fifteenth aspect according to any one of the previous four aspects, the plate-like structure of each supporting element is provided with at least one pair of supporting protrusions for supporting the corresponding rollers of the corresponding pair or rollers.

In a sixteenth aspect according to the previous aspect, the supporting protrusions 11a, develop, at least partially cantilevered, from one portion of the plate-like structure of the corresponding supporting element.

In a seventeenth aspect according to any one of the previous two aspects, supporting protrusions are defined at least partially, optionally predominantly, into a corresponding concavity made in one side, particularly a long side, of the corresponding plate-like structure of the corresponding supporting element.

In an eighteenth aspect according to the previous aspect, the concavity made in the plate-like structure of the corresponding supporting element comprises: a central portion; two peripheral portions joined as a single piece to the central portion at opposite positions, each supporting protrusion developing cantilevered from a corresponding peripheral portion of the concavity.

In a nineteenth aspect according to the previous aspect, the concavity made in the plate-like structure of the corresponding supporting element comprises: a main peripheral portion from which a main supporting protrusion develops cantilevered for supporting the main roller of the corresponding pair of rollers of the corresponding supporting element, the main roller of the corresponding pair of rollers of the corresponding supporting element being mobile along the corresponding main supporting protrusion between the releasing position and the retaining position; an auxiliary peripheral portion placed at the opposite side of the central portion, optionally facing at least partially the main peripheral portion, from which an auxiliary supporting protrusion develops cantilevered for supporting the auxiliary roller of the corresponding pair of rollers of the corresponding supporting element.

In a twentieth aspect according to any one of the previous three aspects, the holding space is at least partially defined by a corresponding concavity of the corresponding plate-like structure of the corresponding supporting element.

In a twenty-first aspect according to the previous aspect when is related to the eighteenth or the nineteenth aspect, the holding space is at least partially defined in the corresponding concavity of the corresponding plate-like structure of the corresponding supporting element among the corresponding central portion of such a concavity and the corresponding rollers of the corresponding pair of rollers engaged on the corresponding protrusions of the corresponding plate-like structure of the corresponding supporting element.

In a twenty-second aspect according to any one of the previous seven aspects, each supporting protrusion is at least partially defined in the corresponding plate-like structure of the corresponding supporting element by at least one groove made in the plate-like structure, optionally by a couple of grooves developing side by side the corresponding supporting protrusion, particularly substantially parallel each other, optionally the supporting protrusion being interposed between the grooves of the corresponding couple of grooves.

In a twenty-third aspect according to any one of the previous eight aspects, each supporting protrusion comprises an elongated body wider towards the corresponding plate-like structure of the supporting element and narrower towards the side opposite the corresponding plate-like structure of the corresponding plate-like structure.

In a twenty-fourth aspect according to the previous aspect, wherein the elongated body of each supporting protrusion comprises: a joining portion connected to the corresponding plate-like structure of the corresponding supporting element; a free end portion faced towards the side opposite the corresponding plate-like structure of the corresponding supporting element, the joining portion being wider than the free end portion and being connected each other by at least one step portion.

In a twenty-fifth aspect according to the previous aspect, the free end portion of the main supporting protrusion is longer than the free end portion of the auxiliary supporting protrusion.

In a twenty-sixth aspect according to any one of the previous two aspects, the joining portion of the auxiliary supporting protrusion is longer than the joining portion of the main supporting protrusion.

In a twenty-seventh aspect according to any one of the previous nine aspects, the main supporting protrusion of the corresponding plate-like structure of the corresponding supporting element is provided with at least one through buttonhole developing substantially parallel the longitudinal development of the main supporting protrusion, optionally the length of the through buttonhole determining the extent of the excursion of the movement of the corresponding main roller between the releasing position and the retaining position.

In a twenty-eighth aspect according to the previous aspect when is related to one or more of the aspects from the twenty-fourth to the twenty-sixth, the through buttonhole is made in the joining portion of the corresponding main supporting protrusion of the corresponding plate-like structure of the corresponding supporting element.

In a twenty-ninth aspect according to any one of the previous two aspects when the twenty-seventh aspect is related to one or more of the aspects from the twenty-fourth to the twenty-sixth, the through buttonhole of the corresponding main supporting protrusion of the corresponding plate-like structure of the corresponding supporting element is adapted to be crossed by a connection rod which connects the main supporting protrusion and the main roller.

In a thirtieth aspect according to the previous aspect, the connection rod is free to move along the corresponding through buttonhole of the corresponding joining portion of the corresponding main supporting protrusion between the buttonhole's opposite ends to allow the movement of the corresponding main roller between the releasing position and the retaining position.

In a thirty-first aspect according to any one of the previous nine aspects, each roller of the corresponding pair of rollers of each supporting element comprises a roller holder having: at last one couple of engaging walls engaging the corresponding couple of grooves made in the corresponding plate-like structure of the corresponding supporting element; at least one sleeve portion at least indirectly connected to at least one engaging wall fitted on the corresponding supporting protrusion of corresponding plate-like structure of the corresponding supporting element.

In a thirty-second aspect according to the previous aspect, the engaging walls and the sleeve portion of the roller holder of the main roller are respectively guided by corresponding grooves and the corresponding main supporting protrusion of the corresponding plate-like structure of the corresponding supporting element between the releasing position and the retaining position of the main roller.

In a thirty-third aspect according to any one of the previous two aspects, each engaging wall of each roller holder is provided with at least one guiding recess engageable by a corresponding guiding edge of the plate-like structure of the corresponding supporting element to maintain the corresponding roller aligned with the corresponding supporting protrusion.

In a thirty-fourth aspect according to the previous aspect, each guiding recess of each roller holder is parallel to the longitudinal axis of the corresponding roller.

In a thirty-fifth aspect according to any one of the previous two aspects, each guiding recess of each roller holder lies on the same median plane of the corresponding roller, optionally on the same median plane of the plate like-structure of the corresponding supporting element.

In a thirty-sixth aspect according to the any one of the previous three aspects, each guiding recess of each roller holder lies on the same median plane where the longitudinal axis of the corresponding roller lies.

In a thirty-seventh aspect according to any one of the previous four aspects, each guiding recess of each roller holder is defined by at least two guiding ribs externally projecting from the corresponding engaging wall and developing in parallel with each other and with the longitudinal axis of the corresponding roller, the corresponding guiding edge of the plate like structure of the corresponding supporting element being interposed between the corresponding guiding ribs.

In a thirty-eighth aspect according to any one of the previous aspect, the guiding ribs of each guiding recess of each roller holder develops along the entire length of the roller holder, between the corresponding roller and a corresponding bottom edge facing away from the corresponding roller.

In a thirty-ninth aspect according to any one of the previous eight aspects, the elastic element of the main roller is fitted on the corresponding main supporting protrusion between this latter and/or the corresponding plate-like structure of the corresponding supporting element and the corresponding sleeve portion of the main roller, optionally the elastic element being at least partially housed inside the sleeve portion of the roller holder of the main roller.

In a fortieth aspect according to any one of the previous twenty-two aspects, the auxiliary supporting protrusion of the corresponding plate-like structure of the corresponding supporting element is provided with at least one through hole adapted to be crossed by a connection bar which connects the auxiliary supporting protrusion and the auxiliary roller, optionally such a connection between the auxiliary supporting protrusion and the auxiliary roller blocking relative to each other.

In a forty-first aspect according to the previous aspect when depends on one or more of aspects from the twenty-fourth to the twenty-sixth, the through hole is made in the joining portion of the corresponding auxiliary supporting protrusion of the corresponding plate-like structure of the corresponding supporting element.

In a forty-second aspect according to any one of the previous aspects, the plate-like structure of each supporting element comprises at least one projection developing respectively from a short bottom edge and a short top edge.

In a forty-third aspect according to the previous aspect, the short bottom edge of the plate-like structure of each supporting element provides a long projection placed close to a middle point of the short bottom edge and, the short top edge of the same plate-like structure provides two short projections, one placed at a corner of the plate-like structure opposite the rollers of the corresponding pair of rollers, and the other short top edge placed close to or at a middle point of the short top edge.

In a forty-fourth aspect according to any one of the previous two aspects, the long projection of the short bottom edge of the plate-like structure of each supporting element is arranged to be inserted into a corresponding engagement seat made in a bottom profile engaged on the upper surface of the curved support plane of the curved conveyor belt and, the short projections are arranged to be inserted into corresponding engagement seats made in the lower surface of the curved spar of the curved conveyor belt.

In a forty-fifth aspect according to any one of the previous three aspects, the distance between the short bottom edge and the short top edge of the corresponding plate-like structure of each supporting element is less than the distance between the bottom profile of the curved support plane and the curved spar.

In a forty-sixth aspect according to any one of the previous four aspects, the plate-like structure of each supporting element comprises a locking and adjusting mechanism operatively placed at the corresponding short top edge, optionally between the corresponding short projections, to lock such plate-like structure between the bottom profile of the curved support plane and the curved spar.

In a forty-seventh aspect according to the previous aspect, the locking and adjusting mechanism comprises at least one threaded nut housed into a corresponding housing seat made in the corresponding short top edge of the corresponding plate-like structure and at least one threaded screw or screwable into the threaded nut through a corresponding through hole made in the lower surface of the curved spar.

In a forty-eighth aspect according to the previous aspect, a cooperation between the threaded screw, the threaded nut and the lower surface of the curved spar of the curved belt conveyor, raises the corresponding plate-like structure of the corresponding supporting element, by inserting the short projections into the corresponding engagement seats of the curved spar, until the short top edge is placed against the lower surface of the curved spar and the plate-like structure is locked.

In a forty-ninth aspect according to any one of the first ten aspects, each supporting element comprises a U-shaped profile, comprising: at least one central portion; a pair of opposed wings developing from the central portion, particularly substantially parallel each other and orthogonal with respect to the central portion.

In a fiftieth aspect according to the previous aspect, the U-shaped profile of each supporting element is made in one piece.

In a fifty-first aspect according to any one of the previous two aspects, at least one guiding element is operatively interposed between the corresponding U-shaped profile and the corresponding main roller of the corresponding pair of rollers to allow such a main roller to move between the releasing position and the retaining position.

In a fifty-second aspect according to any one of the previous three aspects, two opposed guiding elements are operatively interposed between the corresponding opposed wings of the corresponding U-shaped profile of the corresponding supporting element and the corresponding main roller of the corresponding pair of rollers to allow such a main roller to move between the releasing position and the retaining position.

In a fifty-third aspect according to any one of the previous two aspects, wherein each guiding element comprises: at least one guiding slot, optionally two parallel guiding slots, made in each wing of the U-shaped profile of the supporting element; at least one guiding rib, optionally two parallel guiding ribs, protruding from a corresponding engaging wall of a corresponding roller holder of the corresponding main roller of the corresponding pair of rollers, each guiding rib of the roller holder of the corresponding main roller being slidably engaged in the corresponding guiding slot to allow the main roller to move between the releasing position and the retaining position.

In a fifty-fourth aspect according to the previous aspect, the roller holder of the main roller also comprises at least one sleeve portion at least indirectly connected to at least one engaging wall, at the opposite side of the main roller at least one engaging wall and the sleeve portion being provided with at least one seat to lean on a connection rod engageable on the corresponding U-shaped profile of the corresponding supporting element, particularly on a portion of the corresponding connection rod interposed between the opposed wings of the corresponding U-shaped profile.

In a fifty-fifth aspect according to the previous aspect, each of the opposed wings of the corresponding U-shaped profile of the corresponding supporting element is provided with at least one through hole engageable by the corresponding connection rod able to interact with the roller holder of the corresponding main roller, such through holes being aligned substantially along a direction perpendicular to the opposed wings.

In a fifty-sixth aspect according to the previous aspect, each of the opposed wings of the corresponding U-shaped profile of the corresponding supporting element is provided with at least one additional through hole engageable by the corresponding connection rod able to interact with the roller holder of the corresponding main roller, such additional through holes being aligned substantially along a direction perpendicular to the opposed wings different to the alignment direction of the through holes so that to allow an adjustment of the roller holder of the corresponding main roller between the opposed wings of the corresponding U-shaped profile of the corresponding supporting element.

In a fifty-seventh aspect according to the previous aspect, the additional through hole of each opposed wing of the corresponding U-shaped profile of each supporting element is interposed between the corresponding central portion and the corresponding through hole.

In a fifty-eighth aspect according to any one of the previous two aspects, the position of the connection rod can be changed between the through holes and the additional through holes to adjust the end stroke of the roller holder of the corresponding main roller, optionally adjusting the position of the releasing position.

In a fifty-ninth aspect according to any one of the previous five aspects, wherein the elastic element of the main roller is at least partially housed inside the sleeve portion of the roller holder of the main roller, particularly between the connection rod and the main roller.

In a sixtieth aspect according to the previous aspect, the position of the connection rod determines a spring preload force of the elastic element, when the connection rod is engaged to the through holes the spring preloaded force of the elastic element is higher than the spring preloaded force of the elastic element when the connection rod is engaged to the additional through holes.

In a sixty-first aspect according to any one of the previous twelve aspects, the U-shaped profile of each supporting element comprises at least one joining element, preferably two joining elements, operatively interposed between the corresponding opposed wings of the U-shaped profile of the corresponding supporting element and the corresponding auxiliary roller.

In a sixty-second aspect according to the previous aspect, each joining element interposed between a corresponding opposed wing of the corresponding U-shaped profile of each supporting element and the corresponding auxiliary roller comprises: at least one joining slot, optionally two joining slots parallel each other, made in the corresponding opposed wing; at least one joining rib, optionally two parallel joining ribs, protruding from a corresponding engaging wall of a corresponding roller holder of the corresponding auxiliary roller of the corresponding pair of rollers.

In a sixty-third aspect according to the previous aspect, each joining rib of the roller holder of the corresponding auxiliary roller fits into the corresponding joining slot of the corresponding joining element so that the roller holder of the corresponding auxiliary roller cannot move with respect to the opposed wings of the corresponding U-shaped profile.

In a sixty-fourth aspect according to any one of the previous two aspects, each of the opposed wings of the corresponding U-shaped profile of each supporting element is provided with at least one further through hole engageable by a corresponding connection bar on which the roller holder of the corresponding auxiliary roller of the corresponding pair of rollers leans, optionally the further through holes being aligned substantially along a direction perpendicular to the opposed wings.

In a sixty-fifth aspect according to the previous aspect, the further through hole of each opposed wing of the U-shaped profile of the corresponding supporting element is placed between the corresponding joining slots of the corresponding joining element, preferably near the central portion of the corresponding U-shaped profile of the corresponding supporting element.

In a sixty-sixth aspect according to any one of the previous four aspects, the roller holder of the corresponding auxiliary roller of the corresponding pair of rollers provides, at the opposite side of the auxiliary roller, at least one seat to lean on the corresponding connection bar, particularly on a portion of the corresponding connection bar interposed between the corresponding opposed wings of the corresponding U-shaped profile of the corresponding supporting element.

In a sixty-seventh aspect according to any one of the previous eighteen aspects, the U-shaped profile of each supporting element comprises: at least one couple of hooking projections, each developing respectively from a corresponding bottom edge of a corresponding opposed wing; at least one couple of short projections, each developing from a corresponding top edge of the corresponding opposed wing.

In a sixty-eighth aspect according to the previous aspect, wherein the hooking projections and the corresponding short projections ensure the corresponding U-shaped profile of the corresponding supporting element to stably engage the bottom profile of the curved support plane and the curved spar of the curved conveyor belt, particularly the hooking projections and the corresponding short projections of the corresponding U-shaped profile of the corresponding supporting element being arranged to engage corresponding seats made in the bottom profile of the curved support plane and in the curved spar of the curved conveyor belt.

In a sixty-ninth aspect according to any one of the previous twenty aspects, the U-shaped profile of each supporting element comprises a locking and adjusting mechanism operatively placed at a top wall of the U-shaped profile, substantially orthogonal to the central portion and the opposed wings.

In a seventieth aspect according to the previous aspect, wherein the locking and adjusting mechanism comprises: at least one threaded nut housed into a corresponding housing hole made in the corresponding top wall of the corresponding U-shaped profile; at least one threaded screw screwable into the threaded nut through a corresponding through hole made in the lower surface of the curved spar.

In a seventy-first aspect according to the previous aspect, the threaded screw, the threaded nut and the lower surface of the curved spar, cooperating each other for raising the corresponding U-shaped profile of the corresponding supporting element to lock such U-shaped profile between the curved spar and the bottom profile of the curved support plane of the curved belt conveyor.

In a seventy-second aspect according any one of the previous aspects, the movement of the main roller from the retaining position to the releasing position is defined by a rectilinear translation of the main roller along the corresponding longitudinal axis approaching the corresponding supporting element and moving away from the longitudinal axis of the other roller of the corresponding pair of rollers, whereas movement of the main roller from the releasing position to the retaining position is defined by rectilinear translation along the corresponding longitudinal axis, in an opposite direction, moving away from the corresponding supporting element and approaching the longitudinal axis of the other roller of the corresponding pair of rollers.

In a seventy-third aspect according to any one of the previous aspects, the main roller of the pair of rollers being able to automatic move from the releasing position to the retaining position under the effect of a pushing force towards the retaining position when no forces are applied to the main roller directed to the releasing position or one or more forces applied to the main roller towards the releasing position are lower than the pushing force.

It is accordingly an advantage of the present invention to provide a curved belt conveyor, the maintenance operations of which, that are related to the supporting elements and the belt conveyor, are effected quickly and simply.

It is another advantage of the present invention to provide a curved belt conveyor the maintenance operations of which, that are related to the supporting elements and the belt conveyor, are cheaper than the maintenance operations of the prior art embodiments.

It is a further advantage of the present invention to provide a curved belt conveyor, any dismantling, assembling and disassembling operation of which, especially with reference to the supporting elements and the belt conveyor, are effected quickly and easily.

Additional features and advantages are described in, and will be apparent from, the following Detailed Description and the figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

FIG. 13 is a first cross-section view of a detail of the element shown in FIGS. 5 to 11;

FIG. 14 is a second cross-section view of the detail of the element shown in FIG. 13, drawn in a position different with respect to the position shown in FIG. 13;

DETAILED DESCRIPTION

Figure 1:
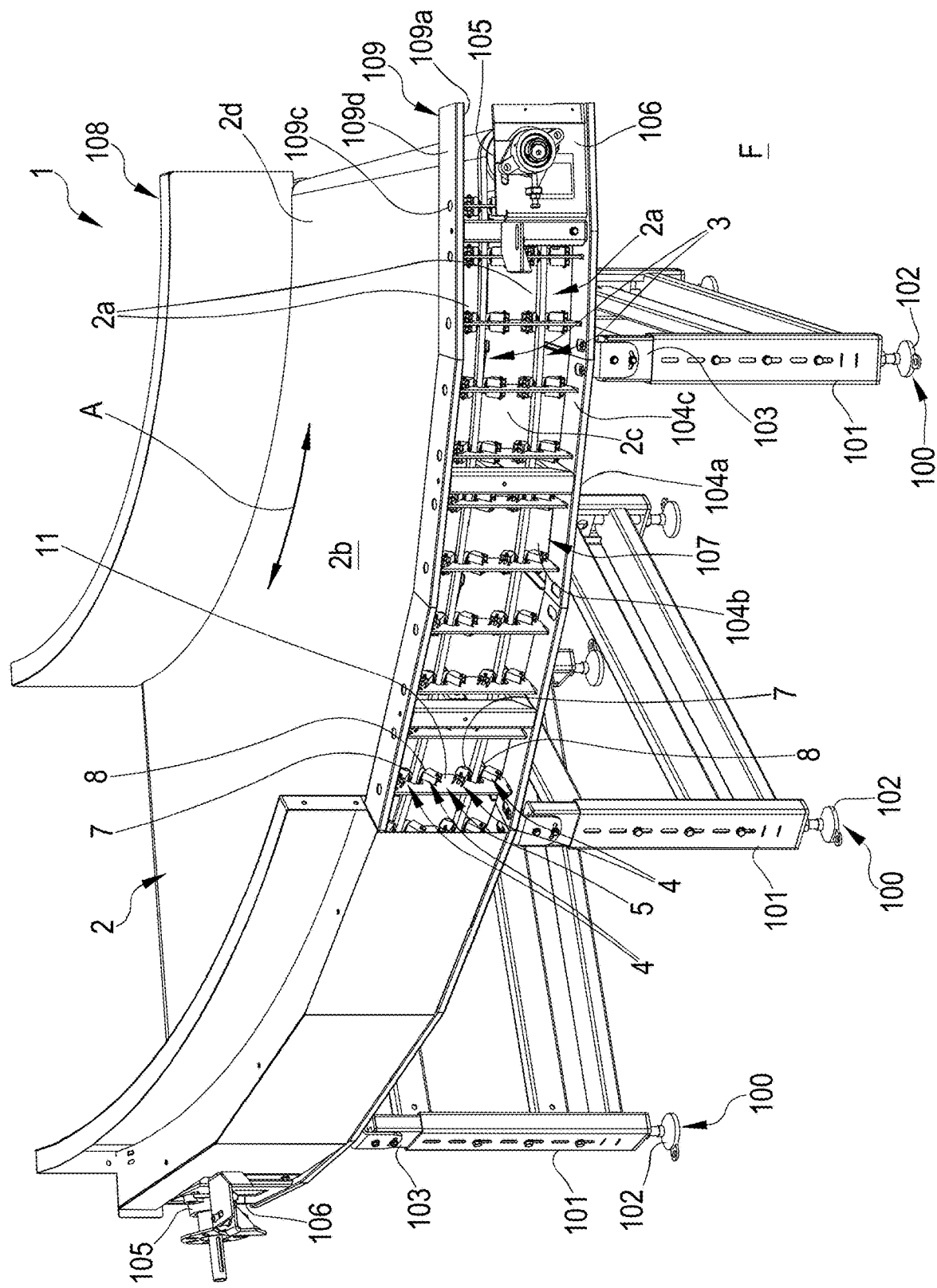
FIG. 1 is a perspective view, partially broken, of a curved belt conveyor according to a first embodiment of the present invention.
Figure 2:
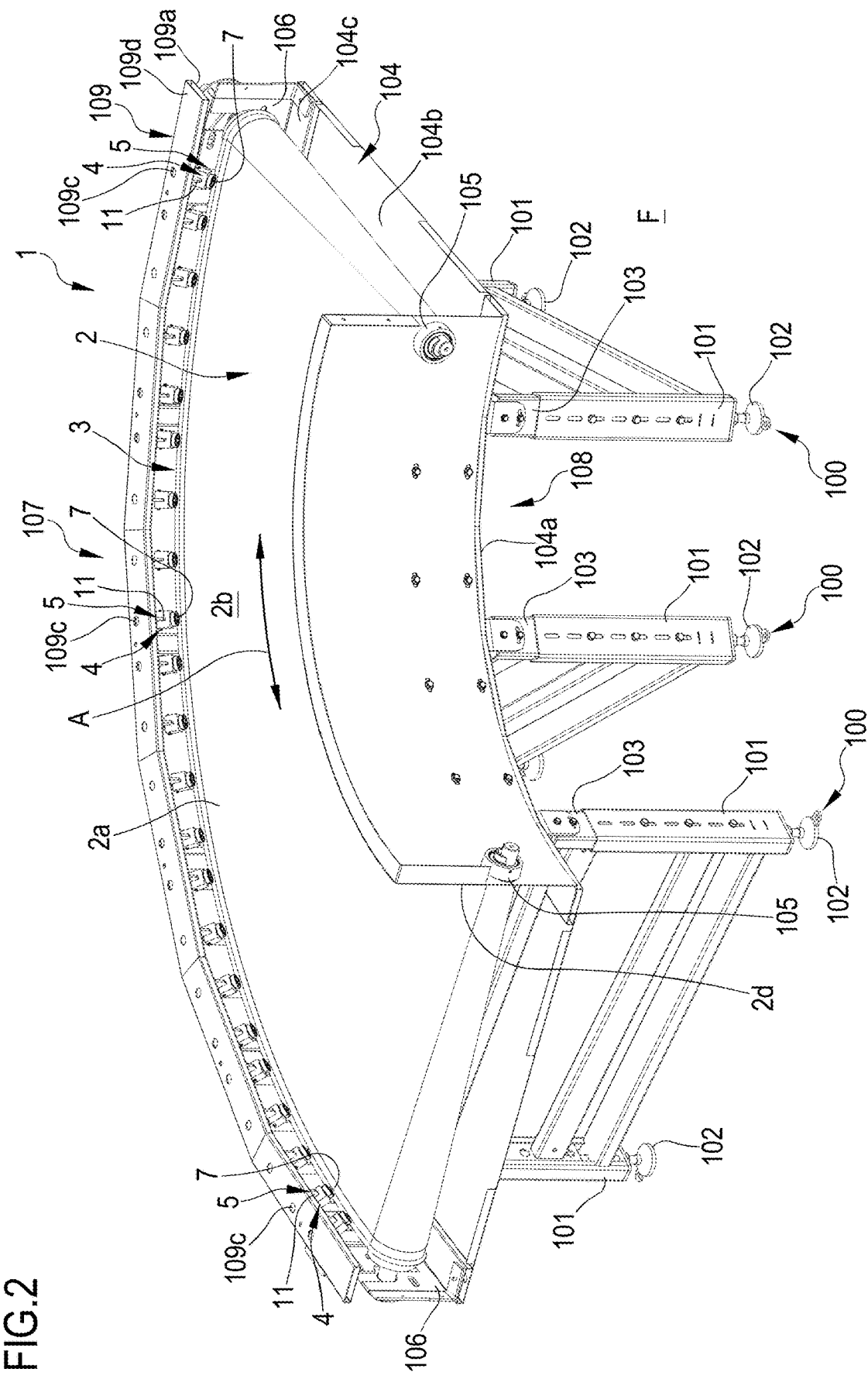
FIG. 2 is a second perspective view of the curved belt conveyor shown in FIG. 1.
Figure 3:
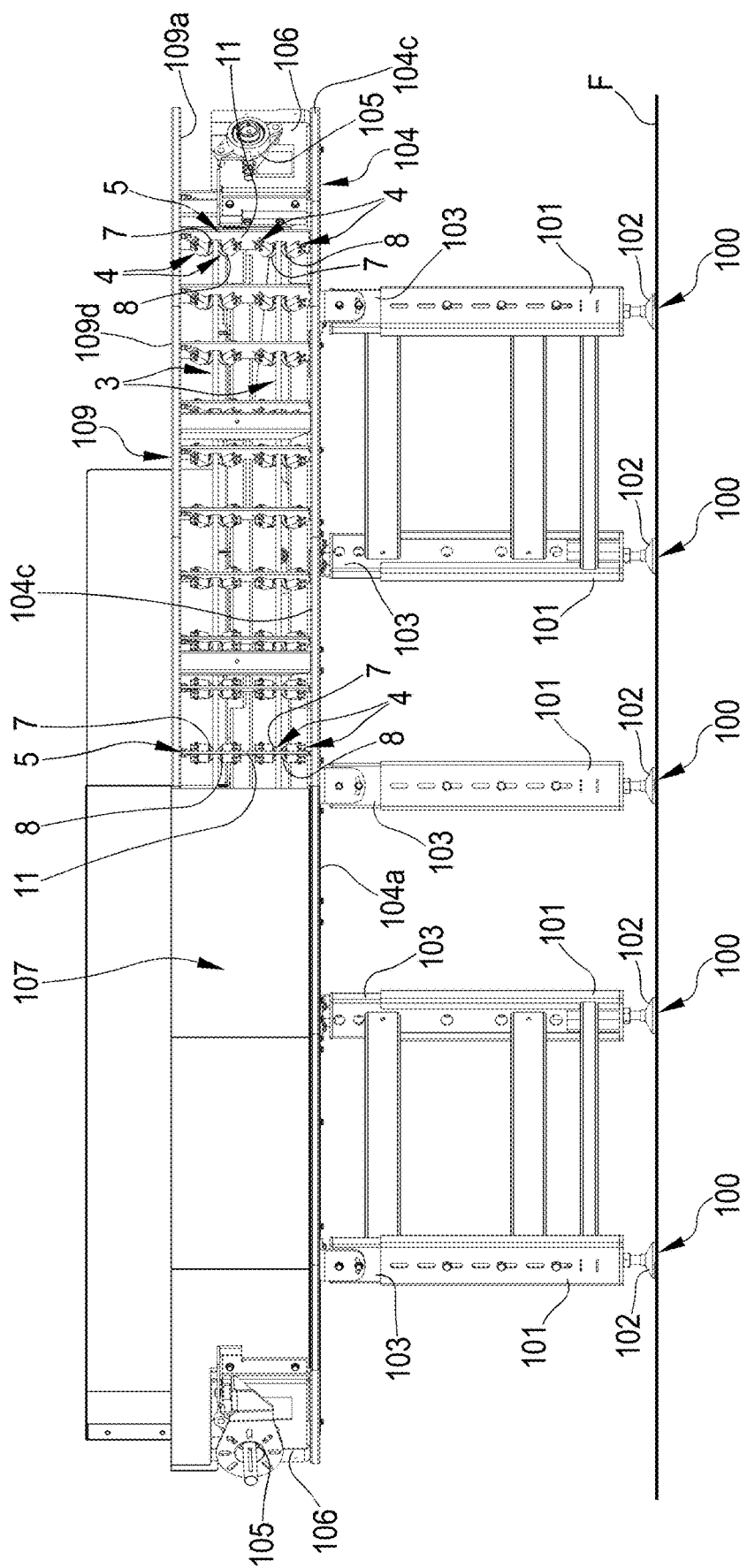
FIG. 3 is a first elevation view, partially broken, of the curved belt conveyor shown in FIGS. 1 and 2.
Figure 4:
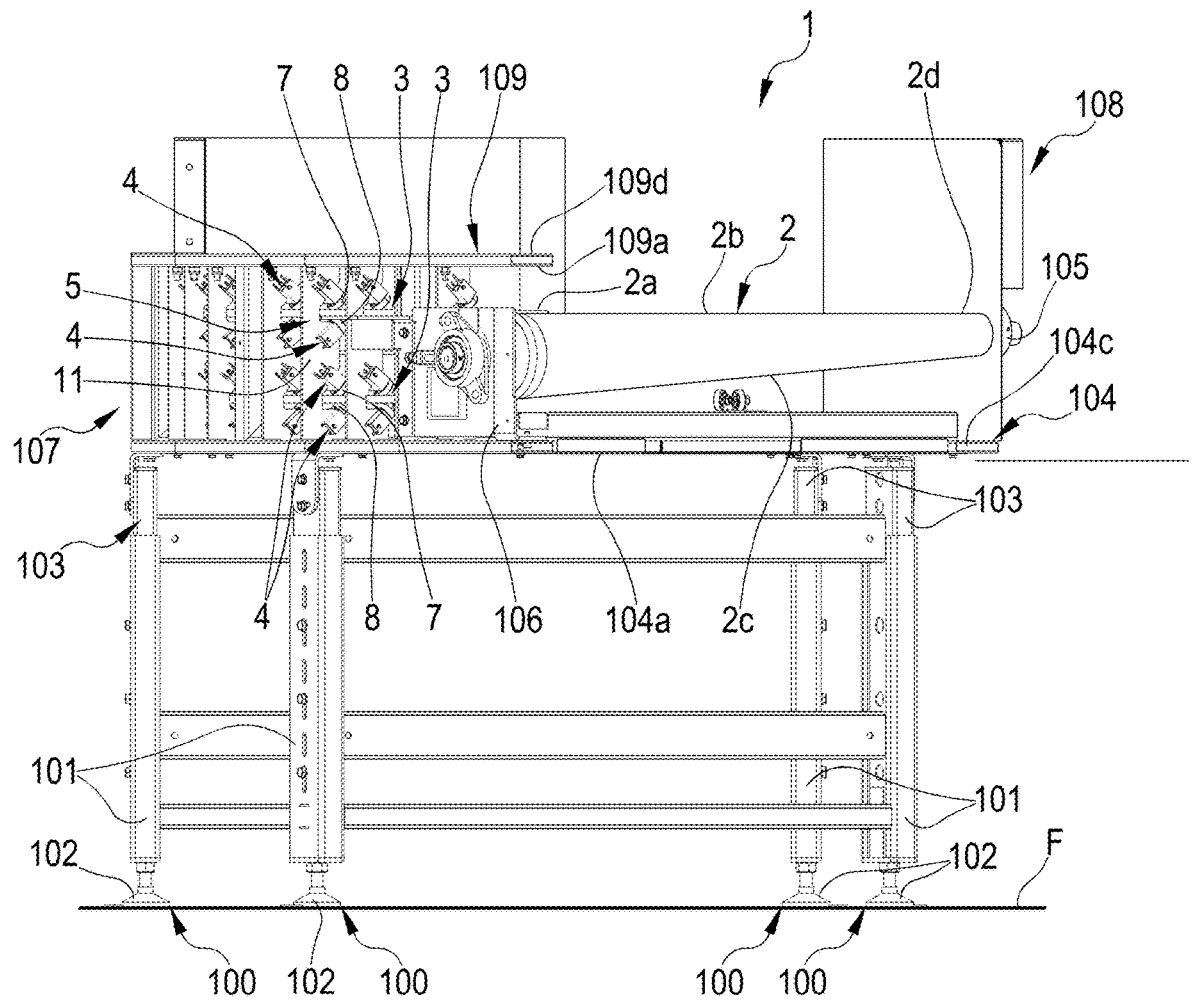
FIG. 4 is a second elevation view, partially broken, of the curved belt conveyor shown in FIGS. 1 to 3.
Figure 6:
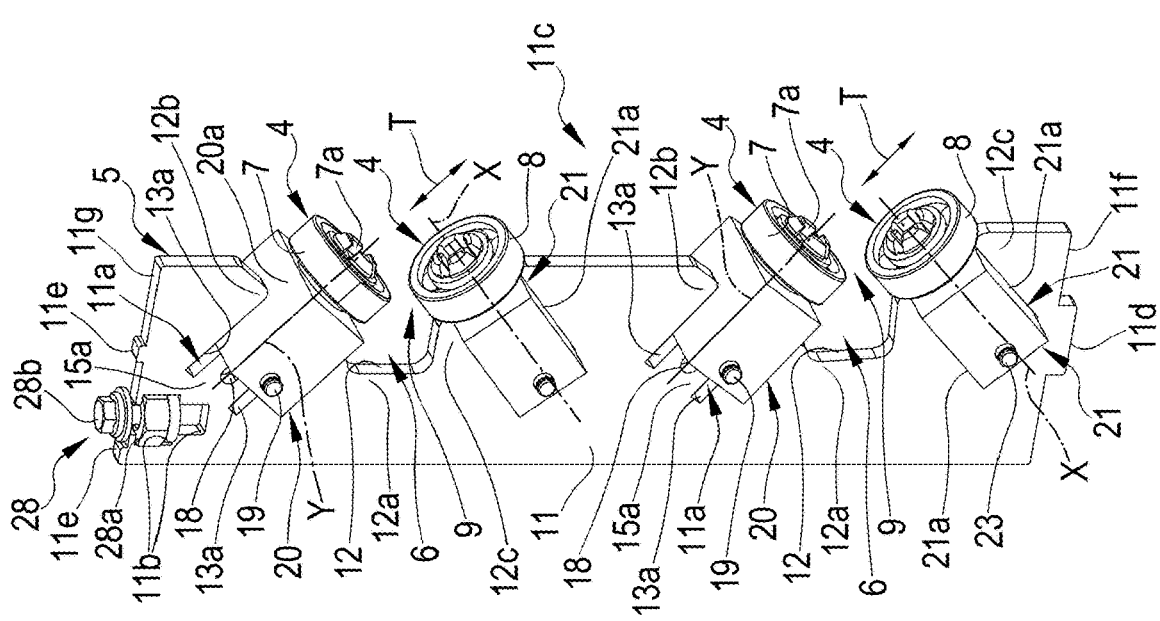
FIG. 6 is a second perspective view of the element shown in FIG. 5.
Figure 5:
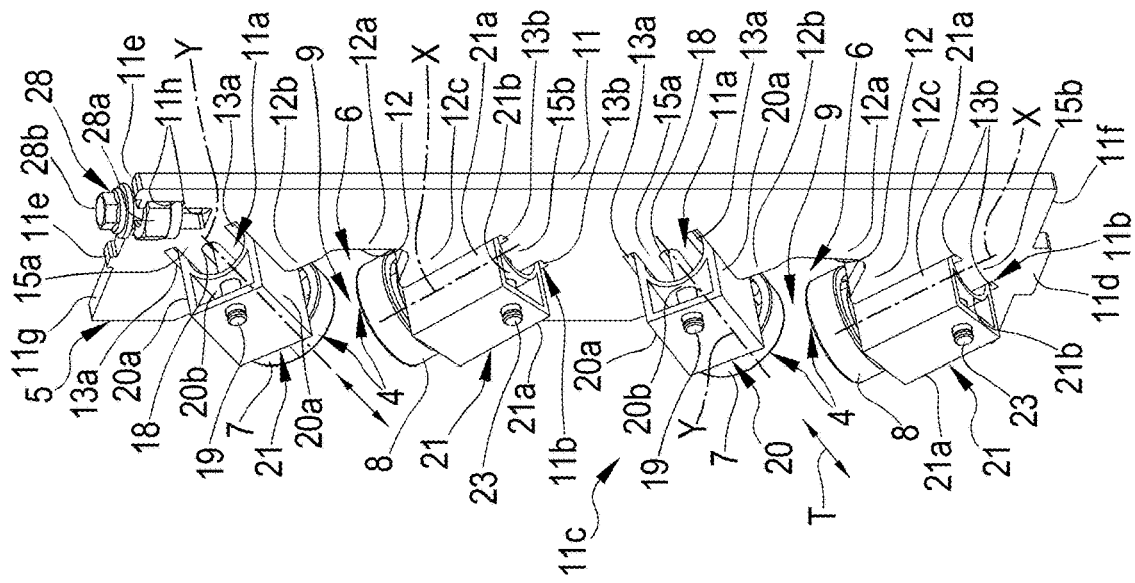
FIG. 5 is first a perspective view of an element of the curved belt conveyor shown in FIGS. 1 to 4.
Figure 9:
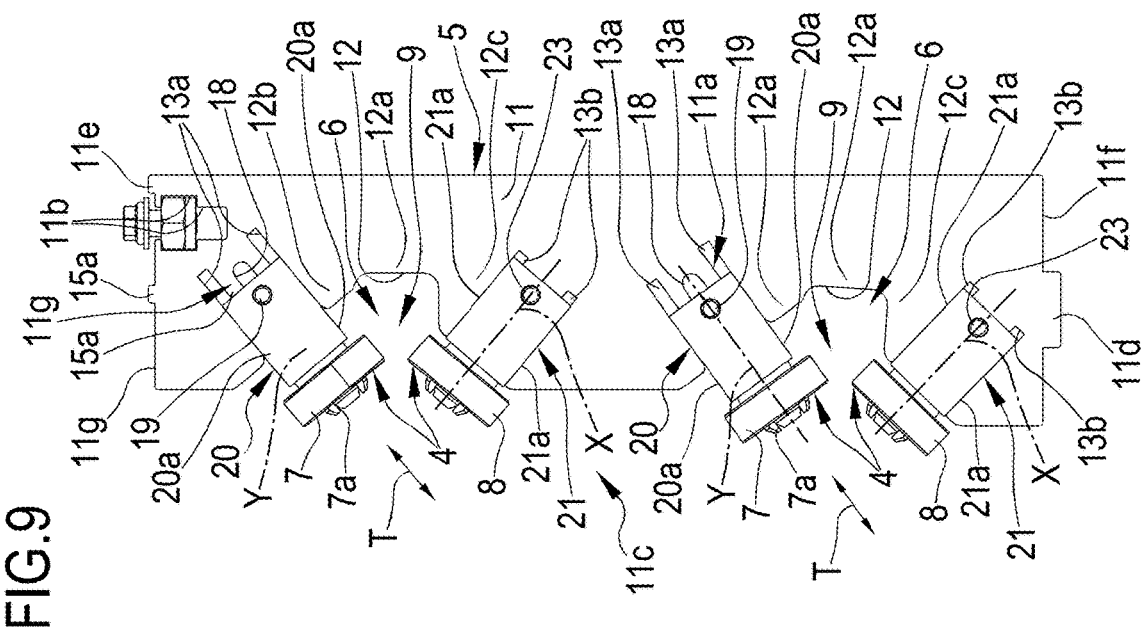
FIG. 9 is a third elevation view of the element shown in FIGS. 5 to 8.

Considering the embodiments shown in FIGS. 1 to 4 and 16 to 19, the invention refers to a curved belt conveyor 1 designed to transport, in a continuous operation, objects, packages, boxes, luggage, baggage, suitcases and similar, articles and solid materials along a curved part A of an advancing path defined by a complex transport system.

As it can be seen in FIGS. 1 to 4 and 16 to 19, the curved belt conveyor 1 comprises a base 100 constituted by a plurality of support legs 101 each having a support foot 102 which lays on the floor F and an upper end 103 fixed to a lower surface 104a of a curved support plane 104.

The curved belt conveyor 1 also comprises a couple of revolving rollers 105 rotationally supported over the support plane 104, optionally at opposite ends of this latter, by corresponding support brackets 106 fixed on an upper surface 104b of the support plane 104, facing away from the lower surface 104a thereof. At least one of the revolving rollers 105 is motorized, but both can be motorized depending of the needs. Whether only one revolving roller 105 is motorized, the other revolving roller 105 is driven in rotation by the rotation of the motorized roller, being therefore an idle roller.

As visible in FIGS. 1 to 4 and 16 to 19, the curved belt conveyor 1 comprises a conveyor belt 2 which develops from one revolving roller 105 to the other extending partially around such revolving rollers 105 according to a closed ring configuration. The conveyor belt 2 is gripped on the revolving rollers 105 so that when the motorized roller is rotationally activated, the conveyor belt moves according to the aforementioned closed ring configuration rotationally dragging the idle roller.

The conveyors rollers 105 define on the conveyor belt 2 an upper carry side run 2b for advancing any transported object along the curved part A (FIGS. 1 and 2) of the advancing path and a lower return run 2c moving contrary to the upper carry side run 2b for giving continuity to the conveyor belt 2 during the advancing movement.

The conveyor belt 2 comprises an outer periphery 2a which defines a wide arch side 107 of the curved belt conveyor 1 and an inner periphery 2d opposite to the outer periphery which defines a narrow arch side 108 of the curved conveyor belt 1.

Figure 15:
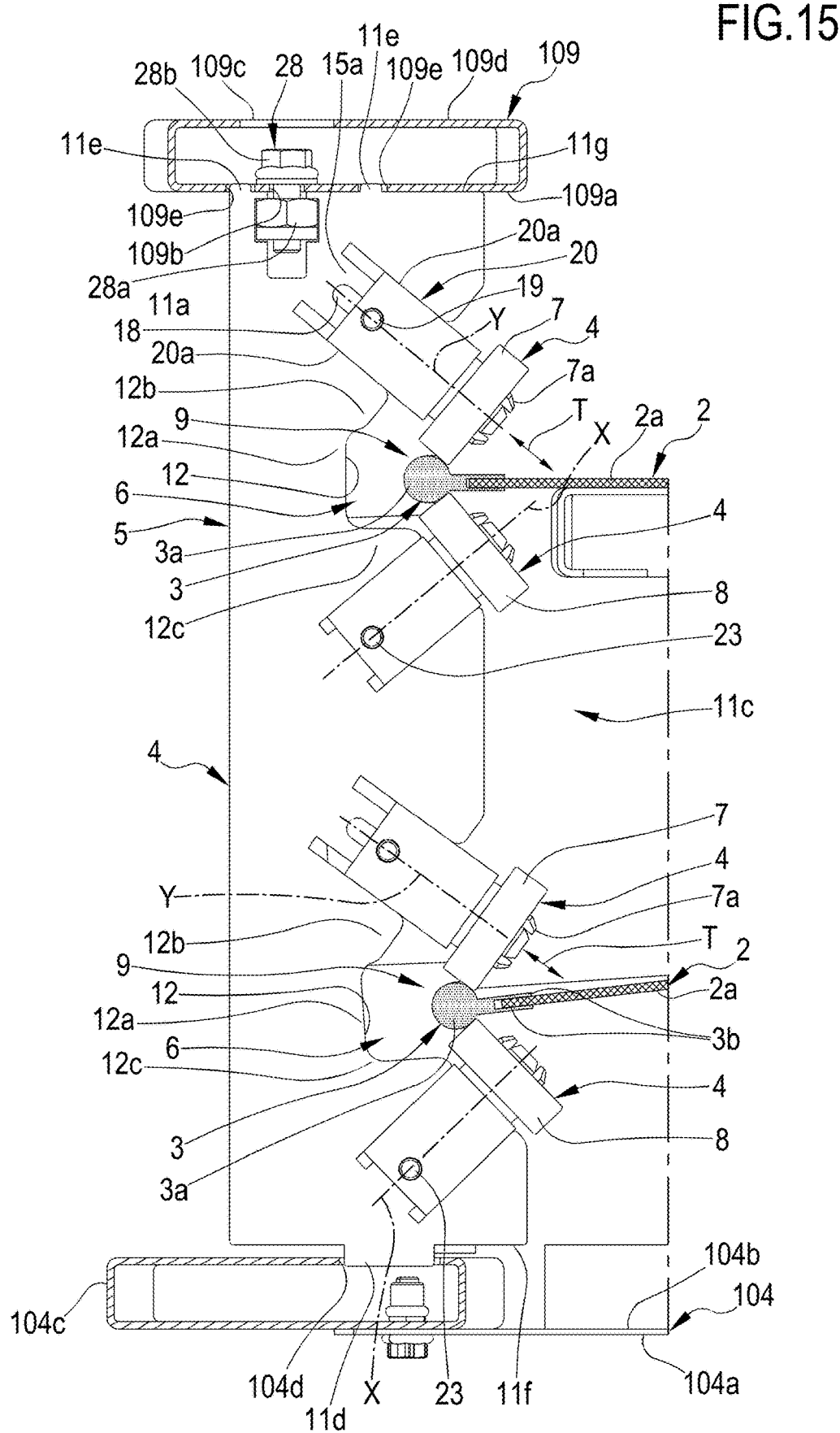
FIG. 15 is further elevation view of the element shown in FIGS. 5 to 11, mounted on the curved belt conveyor, the parts of which are shown in cross-section.
Figure 16:
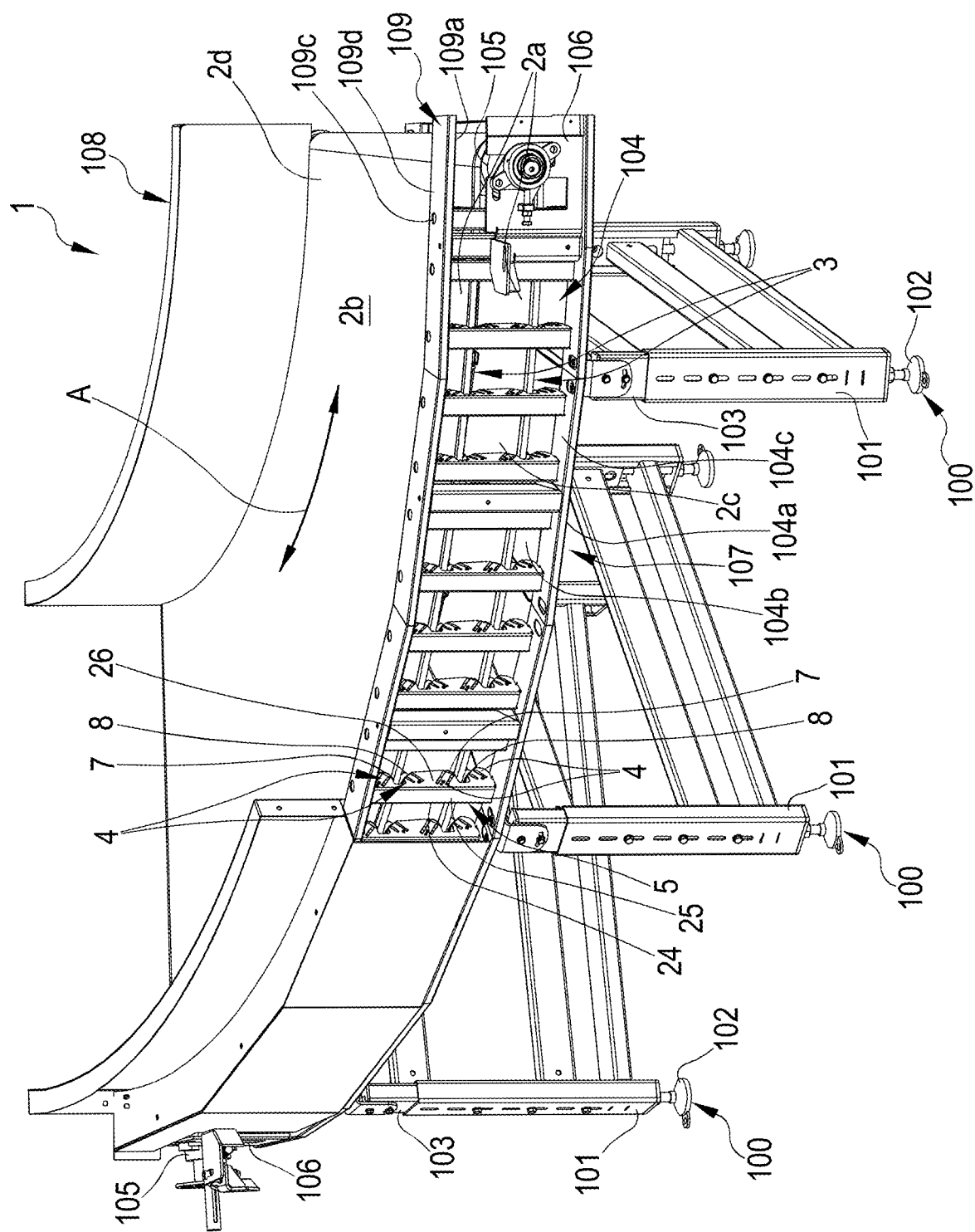
FIG. 16 is a perspective view, partially broken, of a curved belt conveyor according to a second embodiment of the present invention.
Figure 17:
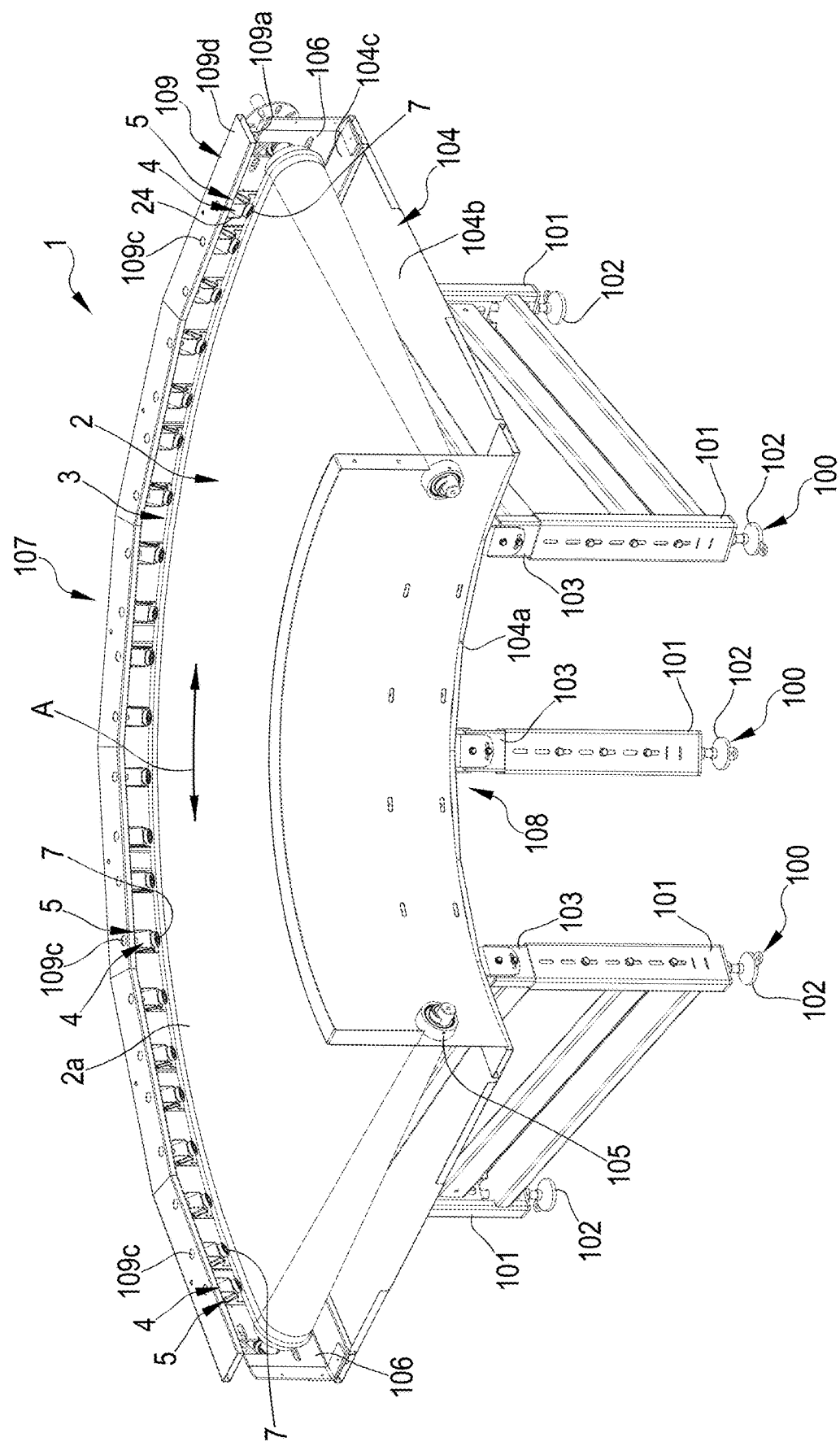
FIG. 17 is a second perspective view of the curved belt conveyor shown in FIG. 16.
Figure 18:
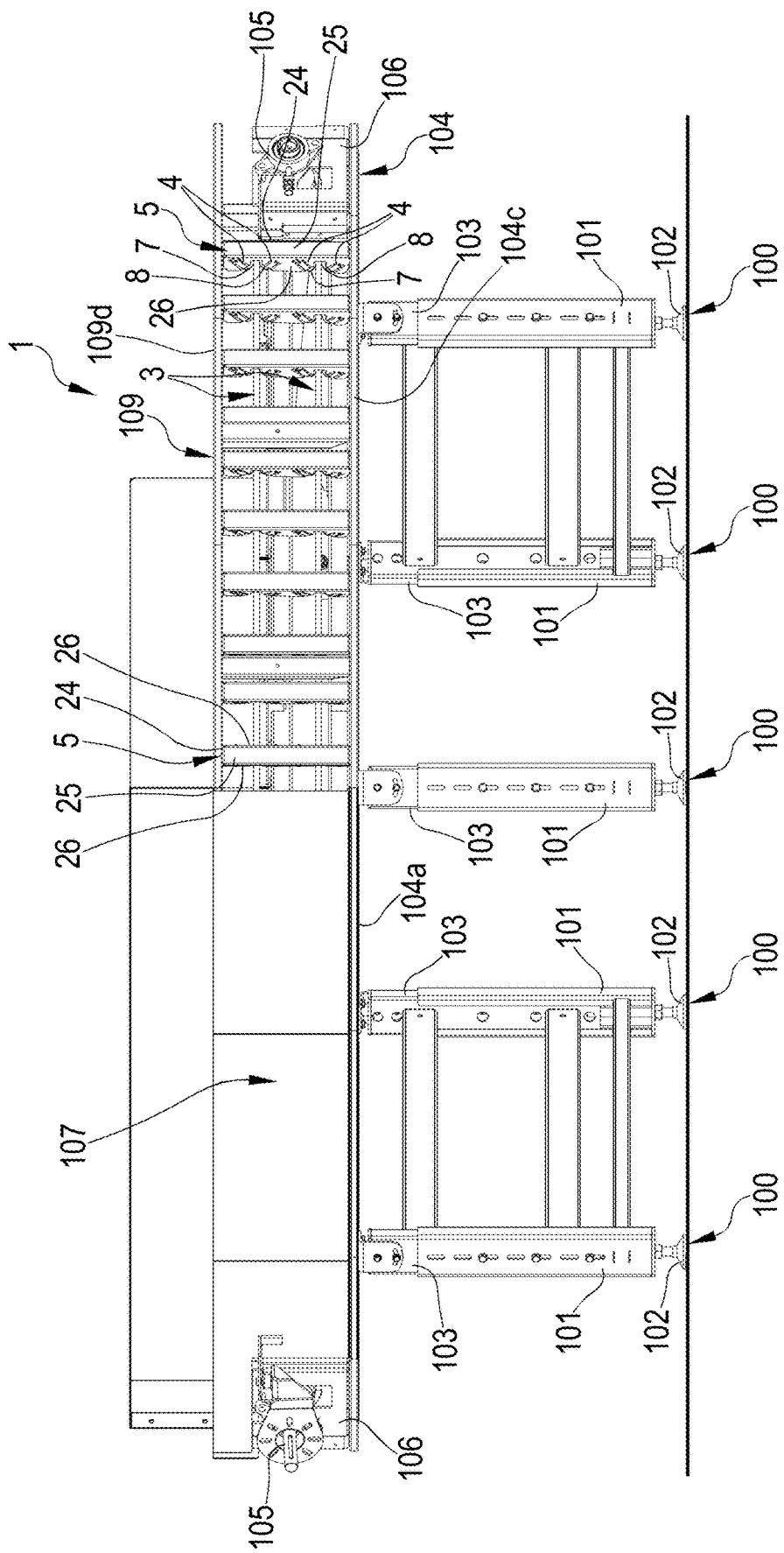
FIG. 18 is a first elevation view, partially broken, of the curved belt conveyor shown in FIGS. 16 and 17.
Figure 19:
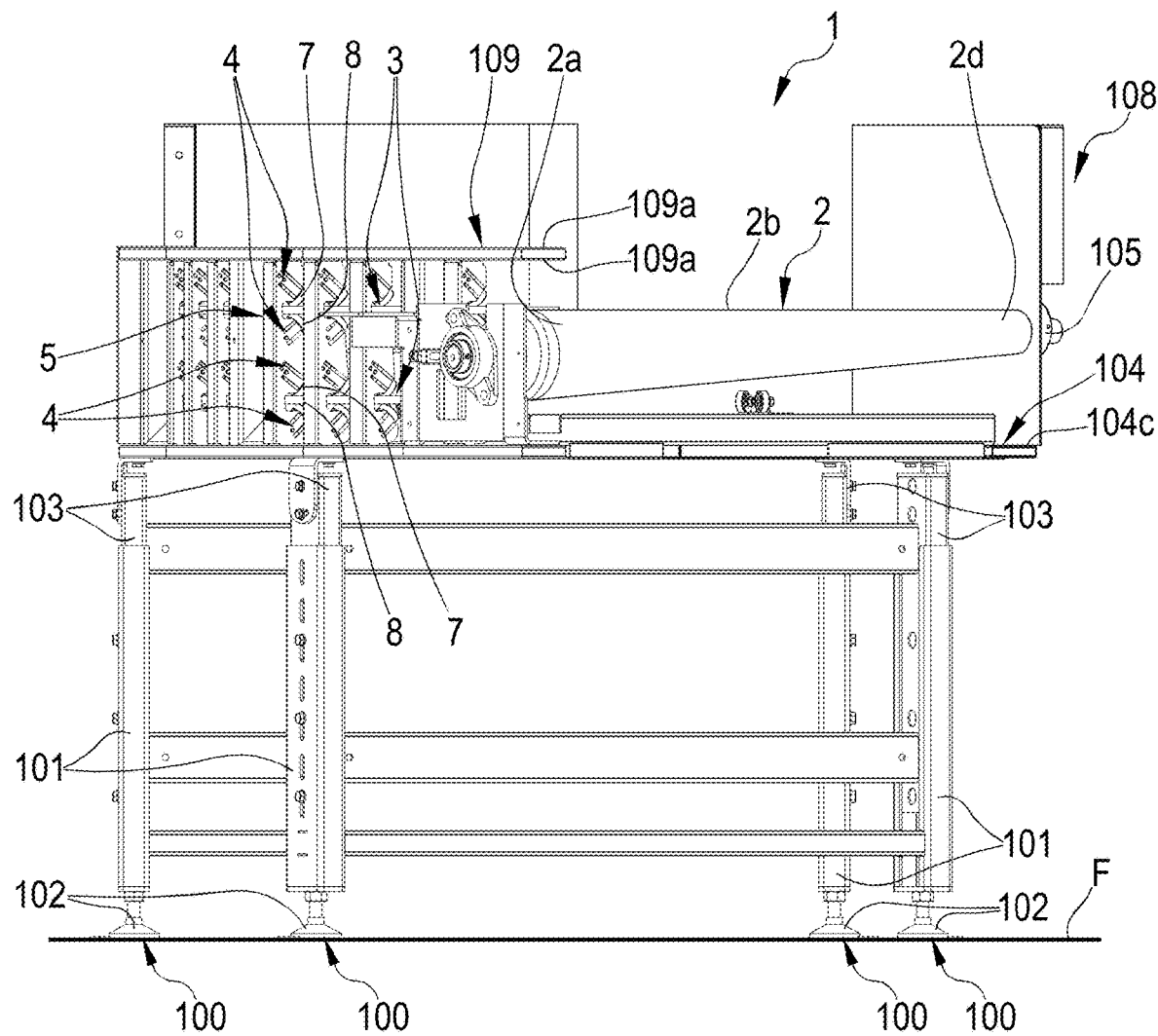
FIG. 19 is a second elevation view, partially broken, of the curved belt conveyor shown in FIGS. 16 to 18.

As visible in FIG. 15, at least one hooking element 3 is associated with the outer periphery 2a of the conveyor belt 2 in order to provide at least one enlargement portion 3a for laterally tensioning the conveyor belt 2 and avoiding this latter to slide towards the narrow arch side 108 of the curved conveyor belt 1.

The hooking element 3 comprises at least one connecting portion 3b, preferably two connecting portions 3b, developing from the enlargement portion 3a placed one over the other and distanced one from the other by an intermediate space 9 which is occupied by the outer periphery 2a of the conveyor belt 2. The connecting portions 3b of the hooking element 3 are sewn to the outer periphery 2a of the conveyor belt 2 to form the outer edge of this latter.

Going on with this description, the curved belt conveyor 1 comprises a plurality of pair of rollers 4 engageable to the hooking element 3 for guiding the conveyor belt 2 during its advancing movement between the revolving rollers 105, maintaining such conveyor belt 2 properly taut.

In particular, the pair of rollers 4 are placed in correspondence of the wide arch side 107 of the curved conveyor belt 1 at two different levels so that to support both the upper carry side run 2b of the conveyor belt 2 and the lower return run 2c of this latter.

As it can be seen in FIGS. 1, 3, 4, 16, 18, and 19, at least one pair of rollers 4 is supported by at least one supporting element 5 placed in correspondence of the wide arch side 107 of the curved conveyor belt 1 and therefore in correspondence of the outer periphery of the conveyor belt 2.

Advantageously, each supporting element 5 supports two pairs of rollers 4 placed one over the other to engage and guide the upper carry side run 2b and the lower return run 2c of the conveyor belt 2 respectively.

As shown in FIGS. 1 to 4 and 16 to 19, the curved belt conveyor 1 comprises a plurality of supporting elements 5 distributed along the wide arch side 107 to keep the outer periphery 2a of the conveyor belt 2, and in particular, the enlargement portion 3a of the hooking element 3 at such wide arch side 107, by the corresponding pairs of rollers 4. In particular, the supporting elements 5 are removably placed at the wide arch side 107 of the curved conveyor belt 1 between the upper surface 104b of the curved support plane 104 and a lower surface 109a of a curved spar 109 developing over the curved support plane 104 according to a position upper than the conveyor belt 2.

As can be seen in FIGS. 5, 6, 9 to 12, 15 and 20 to 23, at least a holding space 6 for the engagement of the hooking element 3 of the conveyor belt 2 is defined among each pair of rollers 4 and the corresponding supporting element 5.

Since each supporting element 5 is provided with two pairs of rollers 4 for supporting the upper carry side run 2b and the lower return run 2c of the conveyor belt 2, each supporting element 5 has two holding spaces 6 placed one over the other for the engagement of the hooking element 3 of the corresponding run 2*b*, 2*c* of the conveyor belt 2.

More in detail, each pair of rollers 4 comprises a main roller 7 and an auxiliary roller 8 defining a corresponding intermediate space 9 (FIGS. 5 to 11, 15, 20, 21 and 23) through which the hooking element 3 of the conveyor belt 2 needs to cross when it hast to be disengaged from the corresponding pair of rollers 4 or be clamped and kept by such pair of rollers 4.

Advantageously, the main roller 7 of each pair of rollers 4 is movable along a trajectory T (FIGS. 5, 6, 9 to 11, 13 to 15 and 20, 21 and 23 to 25) which extends along a longitudinal development of a corresponding main roller shaft 7*a*, between a releasing position (FIGS. 14 and 25), wherein the rollers 7, 8 of the corresponding pair of rollers 4 are distant from each other defining a corresponding intermediate space 9 that allows the passage of the hooking element 3 of the conveyor belt 2 towards and/or from the corresponding holding space 6, and a retaining position (FIGS. 5 to 11, 13, 15, 20, 21, 23 and 24), wherein the rollers 7, 8 of the corresponding pair of rollers 4 are close to each other so that the defined corresponding intermediate space 9 does not allow the passage of the hooking element 3 of the conveyor belt 2 through the corresponding intermediate space 9.

More specifically, when the main roller 7 of the corresponding pair of rollers 4 of each supporting element 5 is placed at the retaining position and the hooking element 3 of the conveyor belt 2 is clamped between the corresponding rollers 7, 8, the main roller 7 avoids the hooking element 3 to move from the corresponding holding space 6 through the corresponding intermediate space 9 by keeping the conveyor belt taut.

According to the just aforementioned condition, when the main roller 7 of the corresponding pair of rollers 4 of each supporting element 5 is placed at the retaining position, the main roller 7 opposes to any movement of the hooking element 3 of the conveyor belt 2 from the corresponding holding space 6 through the corresponding intermediate space 9, particularly towards the narrow arch side 108 of the curved belt conveyor 1.

Therefore, any movement of the conveyor belt 2 from the corresponding holding space 6 towards the narrow arch side 108 of the curved belt conveyor 1 is contrasted by the corresponding rollers 7, 8 of the corresponding pair of rollers 4.

Considering FIGS. 5, 6, 9 to 11, 13 to 15 and 20, 21 and 23 to 25, the trajectory T of the movement of the main roller 7 of the corresponding pair of rollers 4 of each supporting element 5 between the releasing position and the retaining position is inclined with respect to a longitudinal axis X of the corresponding auxiliary roller 8 of the same pair of rollers 4. Optionally, the main roller 7 of the corresponding pair of rollers 4 of each supporting element 5 converges to the longitudinal axis X of the corresponding auxiliary roller 8 of the same pair of rollers 4 from the releasing position to the retaining position.

It has to be noted that the trajectory T of the movement of the main roller 7 of the corresponding pair of rollers 4 of each supporting element 5 between the releasing position and the retaining position defines a non-rotational movement between such positions. Therefore, the main roller's movement is not a rotation or a pivotable movement around a rotational and/or a horizontal axis. In particular, the trajectory T of the movement of the main roller 7 of the corresponding pair of rollers 4 of each supporting element 5 between the releasing position and the retaining position is substantially rectilinear. Optionally, the movement effected by the main roller 7 along the trajectory T is a translation movement which ends in correspondence of one of the aforementioned positions.

Alternatively, it is also possible that the trajectory T of the movement of the main roller 7 of the corresponding pair of rollers 4 of each supporting element 5 between the releasing position and the retaining position is substantially curvilinear (embodiment not shown in any figure but just disclosed). In this case, the trajectory T is slightly curvilinear, but yet converging towards the longitudinal axis X of the corresponding auxiliary roller 8 of the corresponding pair of rollers 4.

Preferably, the main roller 7 of the corresponding pair of rollers 4 of each supporting element 5 is provided with at least one elastic element 10 adapted to move the main roller 7 towards the retaining position. The elastic element 10 is operatively interposed between the main roller 7 of the corresponding pair of rollers 4 of each supporting element 5 and this latter.

Optionally the elastic element 10 is arranged to oppose the movement of the main roller 7 of the corresponding pair of rollers 4 of each supporting element 5 from the retaining position to the releasing position and to push the main roller 7 from the releasing position to the retaining position when no force towards the releasing position is applied on the corresponding main roller 7 or no force equal or higher than the push action/reaction of the elastic element 10 towards the releasing position is applied on the corresponding main roller 7. More in detail, the elastic element 10 comprises at least one spring 10*a*, particularly a coil spring.

Referring to the embodiments shown in FIGS. 1 to 15, each supporting element 5 comprises a plate-like structure 11. The plate-like structure 11 of each supporting element 5 is preferably made in one piece.

However, for the purposes of the present invention, the plate-like structure 11 of each supporting element 5 can also be made by two or more plates, more or less thin, joined together, optionally according to a superimposed relation so that to form a single body, able to behave as plate-like structure made in one piece.

Figure 8:
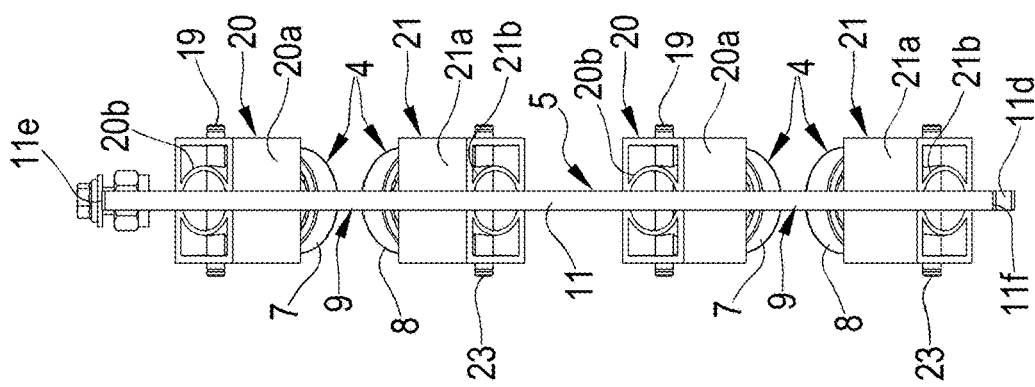
FIG. 8 is a second elevation view of the element shown in FIGS. 5 to 7.
Figure 7:
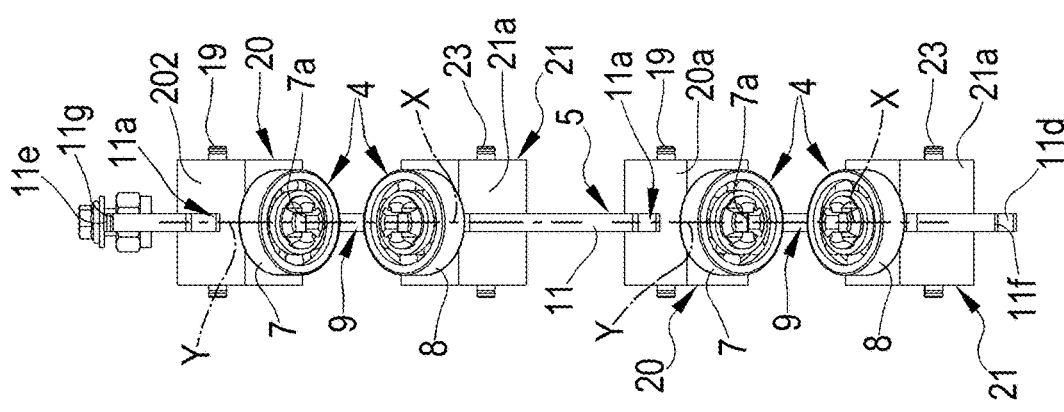
FIG. 7 is a first elevation view of the element shown in FIGS. 5 and 6.

As clearly visible in FIGS. 7 and 8, the plate-like structure 11 of each supporting element 5 is aligned to corresponding longitudinal axis Y, X of the rollers 7, 8 of the corresponding pair of rollers 4 respectively. More specifically, the plate-like structure 11 of each supporting element 5 is placed and/or lies at a median plane of each roller 7, 8 of the corresponding pair of rollers 4.

In order to support the rollers 7, 8 of the corresponding pair of rollers 4 of the corresponding supporting element 5, the corresponding plate-like structure 11 is provided with at least one pair of supporting protrusions 11*a*, 11*b*. Such supporting protrusions 11*a*, 11*b* develop, at least partially cantilevered, from one portion of the plate-like structure 11 of the corresponding supporting element 5.

In particular, the supporting protrusions 11*a*, 11*b* corresponding to each pair of rollers 4 are defined at least partially, optionally predominantly, into a corresponding concavity 12 made in one side, particularly a long side 11*c*, of the corresponding plate-like structure 11 of the corresponding supporting element 5.

Each concavity 12 made in the corresponding plate-like structure 11 of the corresponding supporting element 5 comprises a central portion 12*a* and two peripheral portions 12*b*, 12*c* joined as a single piece to the central portion 12*a* at opposite positions. Each supporting protrusion 11*a*, 11*b* develops cantilevered from a corresponding peripheral portion 12*b*, 12*c* of the corresponding concavity 12.

Always considering the FIGS. 5, 6, 9 to 12 and 15, each concavity 12 made in the plate-like structure 11 of the corresponding supporting element 5 comprises a main peripheral portion 12b from which a corresponding main supporting protrusion 11a develops cantilevered for supporting the corresponding main roller 7 of the corresponding pair of rollers 4 of the corresponding supporting element 5. The main roller 7 of the corresponding pair of rollers 4 of the corresponding supporting element 5 is mobile along the corresponding main supporting protrusion 11a between the releasing position and the retaining position.

Each concavity 12 made in the plate-like structure 11 of the corresponding supporting element 5 also comprises an auxiliary peripheral portion 12c from which a corresponding auxiliary supporting protrusion 11b develops cantilevered for supporting the corresponding auxiliary roller 8 of the corresponding pair of rollers 4 of the corresponding supporting element 5.

As it is possible to see in FIGS. 5, 6, 9 to 12 and 15, each holding space 6 is at least partially defined by a corresponding concavity 12 of the corresponding plate-like structure 11 of the corresponding supporting element 5.

More particularly, each holding space 6 is at least partially defined in the corresponding concavity 12 of the corresponding plate-like structure 11 of the corresponding supporting element 5 among the corresponding central portion 12a of such a concavity 12 and the corresponding rollers 7, 8 of the corresponding pair of rollers 4 engaged on the corresponding protrusions 11a, 11b of the corresponding plate-like structure 11 of the corresponding supporting element 5.

It has to be noted that each supporting protrusion 11a, 11b is at least partially defined in the corresponding plate-like structure 11 of the corresponding supporting element 5 by at least one groove 13a, 13b made in the plate-like structure 11, preferably by a couple of grooves 13a, 13b developing side by side the corresponding supporting protrusion 11a, 11b, particularly substantially parallel each other. In this case, each supporting protrusion 11a, 11b is interposed between the corresponding grooves 13a, 13b of the corresponding couple of grooves 13a, 13b.

Specifying more in detail the supporting protrusions 11a, 11b, each of them comprises a corresponding elongated body 14a, 14b wider towards the corresponding plate-like structure 11 of the corresponding supporting element 5 and narrower towards the side opposite the corresponding plate-like structure 11 of the corresponding plate-like structure 11.

Figure 10:
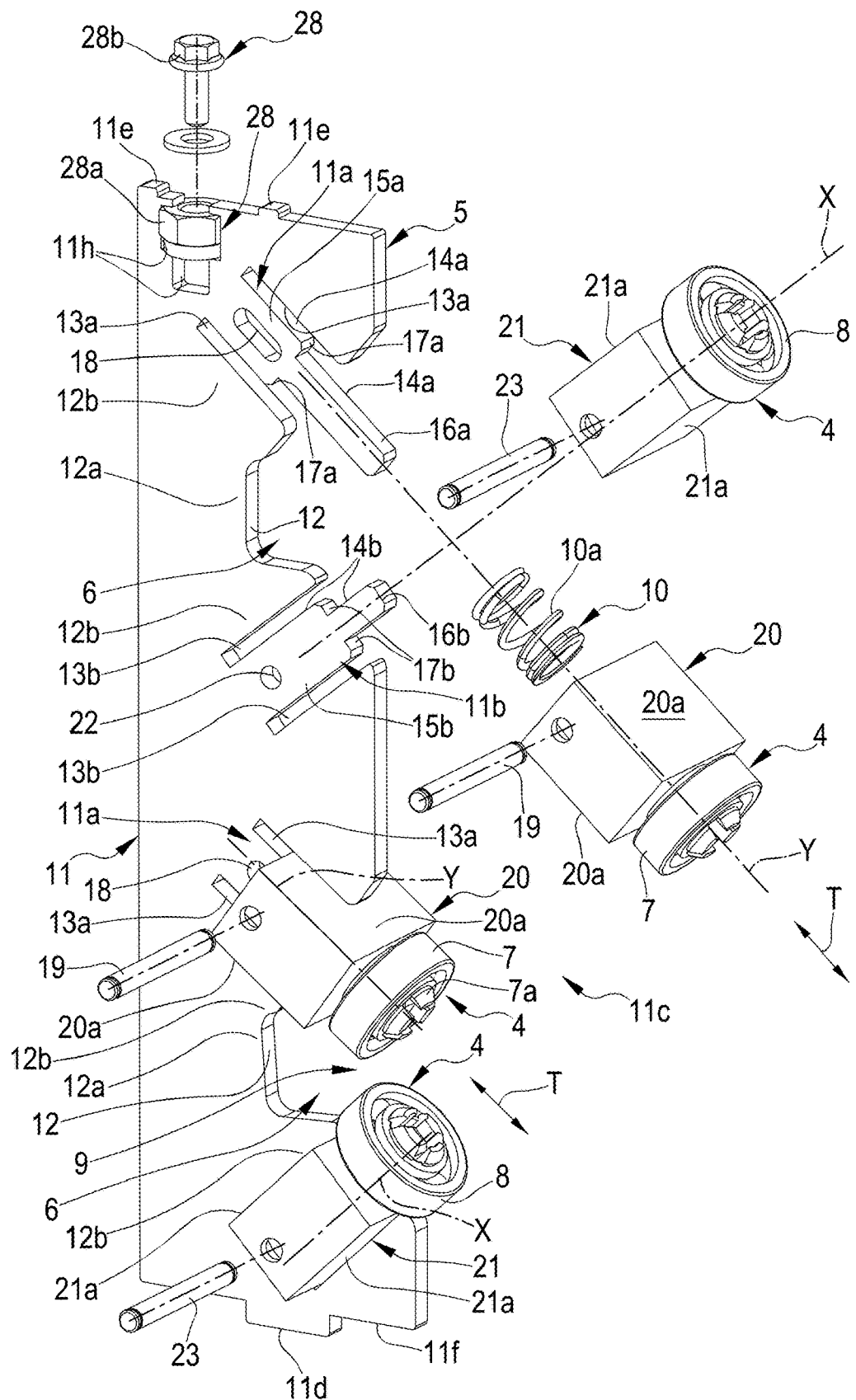
FIG. 10 is a perspective view, at least partially exploded, of the element shown in FIGS. 5 to 9.
Figure 11:
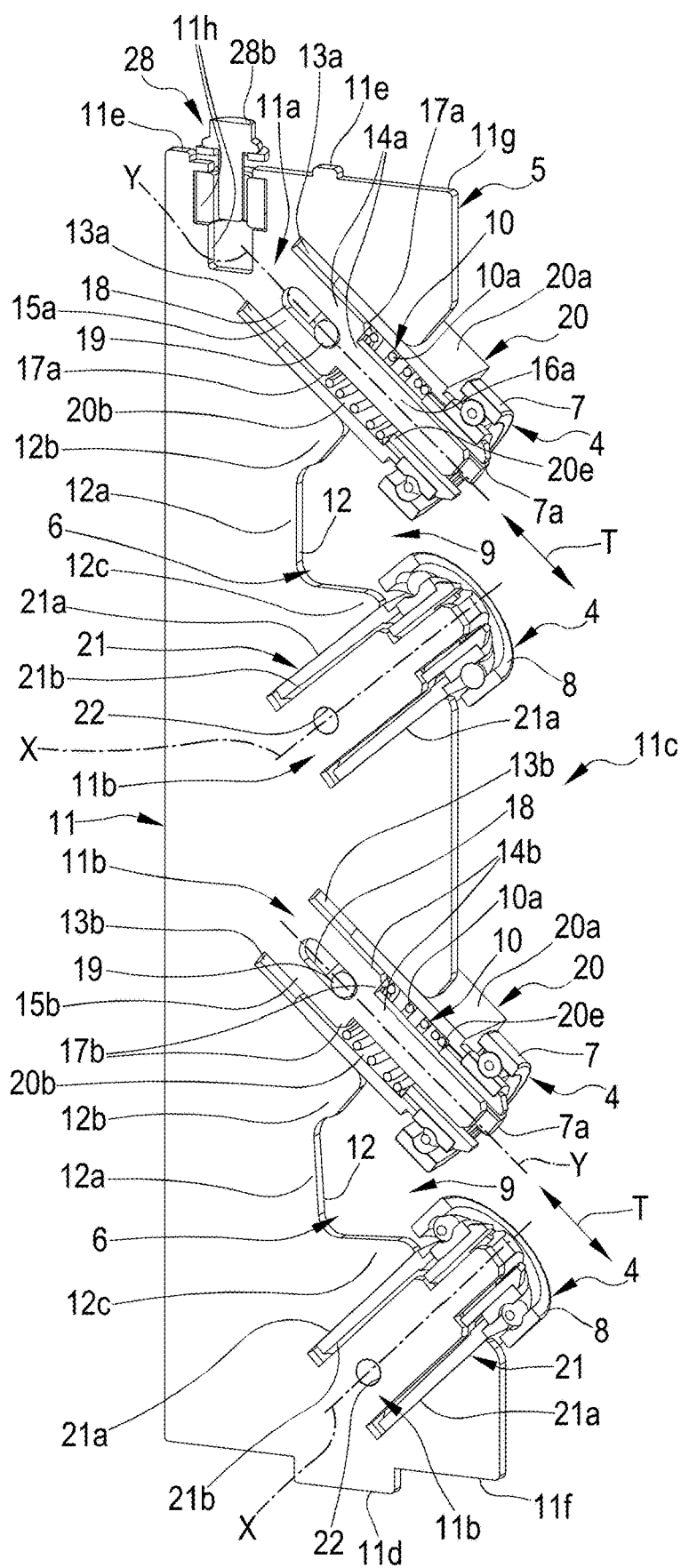
FIG. 11 is a perspective view of a cross section of the element shown in FIGS. 5 to 10, executed along a median plane of such element.
Figure 12:
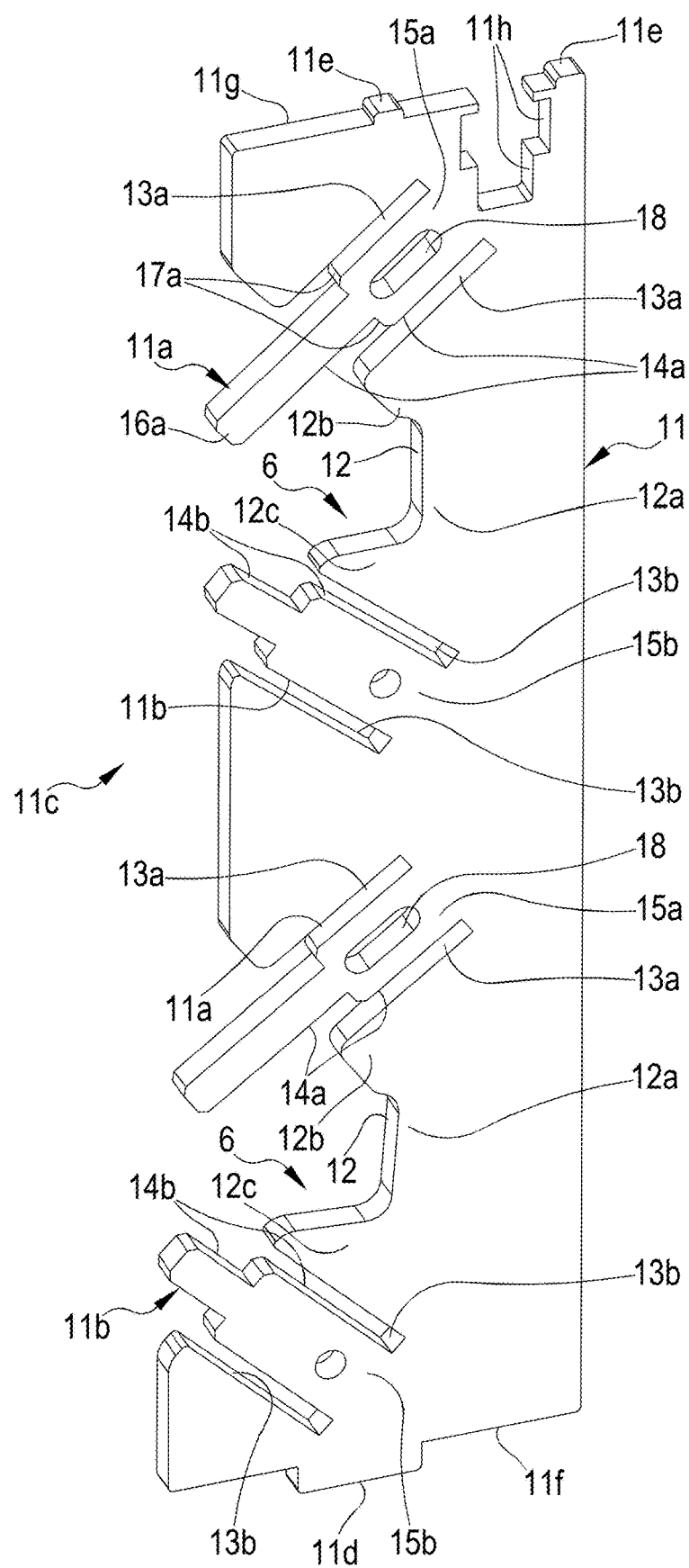
FIG. 12 is a perspective of a plate-like structure of the of the element shown in FIGS. 5 to 11.

As can be seen in FIGS. 10 to 12, the elongated body 14a, 14b of each supporting protrusion 11a, 11b comprises a joining portion 15a, 15b connected to the corresponding plate-like structure 11 of the corresponding supporting element 5 and a free end portion 16b, 16b faced towards the side opposite the corresponding plate-like structure 11 of the corresponding supporting element 5. The joining portion 15a, 15b is wider than the corresponding free end portion 16a, 16b and they are connected each other by at least one corresponding step portion 17a, 17b.

Deepening more and more, the free end portion 16a of each main supporting protrusion 11a is longer than the free end portion 16b of the corresponding auxiliary supporting protrusion 11b. The joining portion 15b of each auxiliary supporting protrusion 11b is longer than the joining portion 15a of the corresponding main supporting protrusion 11a.

In order to ensure a connection between each main supporting protrusion 11a of the corresponding plate-like structure 11 of the corresponding supporting element 5 and the corresponding main roller 7 allowing this latter to move between the releasing position and the retaining position, the corresponding main supporting protrusion 11a is provided with at least one through buttonhole 18 developing substantially parallel to the longitudinal development of the main supporting protrusion 11a. Optionally, the length of the through buttonhole 18 determines the extent of the excursion of the movement of the corresponding main roller 7 between the releasing position and the retaining position.

As shown in FIGS. 5, 6, 9 to 15, it is preferred that the through buttonhole 18 is made in the joining portion 15a of the corresponding main supporting protrusion 11a of the corresponding plate-like structure 11 of the corresponding supporting element 5. Moreover, the through buttonhole 18 of each corresponding main supporting protrusion 11a of the corresponding plate-like structure 11 of the corresponding supporting element 5 is adapted to be crossed by a connection rod 19 which connects the corresponding main supporting protrusion 11a and the main roller 7. In detail, the connection rod 19 is free to move along the corresponding through buttonhole 18 of the corresponding joining portion 15a of the corresponding main supporting protrusion 11a between opposite ends of the buttonhole 18 to allow the movement of the corresponding main roller 7 between the releasing position and the retaining position.

As can be seen in FIGS. 1 to 11 and 13 to 15, each roller 7, 8 of the corresponding pair of rollers 4 of each supporting element 5 comprises a corresponding roller holder 20, 21. Each roller holder 20, 21 has at last one couple of corresponding engaging walls 20a, 21a engaging the corresponding couple of grooves 13a, 13b made in the corresponding plate-like structure 11 of the corresponding supporting element 5.

Each roller holder 20, 21 further comprises at least one sleeve portion 20b, 21b connected to at least one of the engaging walls 20a, 21a, optionally tangentially joined to two opposite engaging walls 20a, 21a, and fitted on the corresponding supporting protrusion 11a, 11 b of the corresponding plate-like structure 11 of the corresponding supporting element 5.

Considering the FIGS. 5, 6, 9 to 11, and 13 to 15, the engaging walls 20a and the sleeve portion 20b of the roller holder 20 of the main roller 7 are respectively guided by the corresponding grooves 13a and the corresponding main supporting protrusion 11a of the corresponding plate-like structure 11 of the corresponding supporting element 5 between the releasing position and the retaining position of the main roller 7.

Also the elastic element 10 of the main roller 7 is fitted on the corresponding main supporting protrusion 11a between this latter and/or the corresponding plate-like structure 11 of the corresponding supporting element 5 and the corresponding sleeve portion 20b of the main roller 7. More in detail, the elastic element 10 of the main roller 7 is placed between the corresponding step portion 17a and an inner abutment portion 20e (FIGS. 11, 13 and 14) of the corresponding holder roller 20 located close to the main roller 7. Optionally the elastic element 10 is at least partially, preferably completely, housed inside the sleeve portion 20a of the roller holder 20 of the main roller 7.

Unlike the corresponding main supporting protrusion 11a, each auxiliary supporting protrusion 11b of the corresponding plate-like structure 11 of the corresponding supporting element 5 is provided with at least one through hole 22 adapted to be crossed by a connection bar 23 which connects such auxiliary supporting protrusion 11b and the corresponding auxiliary roller 8. Optionally the connection between each auxiliary supporting protrusion 11b and the corresponding auxiliary roller 8 holds steady with respect to each other.

The through hole 22 is made in the joining portion 15b of the corresponding auxiliary supporting protrusion 11b of the corresponding plate-like structure 11 of the corresponding supporting element 5.

With reference to FIGS. 5 to 15, the plate-like structure 11 of each supporting element 5 comprises at least one projection 11d, 11e developing respectively from a short bottom edge 11f and a short top edge 11g.

In particular, the short bottom edge 11f of the plate-like structure 11 of each supporting element 5 provides a long projection 11d placed close to a middle point of the short bottom edge 11f, whereas the short top edge 11g of the same plate-like structure 11 provides two short projections, one placed at a corner of the plate-like structure face on the opposite side to the rollers 7, 8 of the corresponding pair of rollers 4, and the other placed close to or at a middle point of the short top edge 11g.

Referring to FIG. 15, the long projection 11d of the short bottom edge 11f of the plate-like structure 11 of each supporting element 5 is arranged to be inserted into a corresponding engagement seat 104d made in a bottom profile 104c engaged on the upper surface 104b of the curved support plane 104 of the curved conveyor belt 1 and the short projections 11e are arranged to be inserted into corresponding engagement seats 109e made in the lower surface of the curved spar 109 of the curved conveyor belt 1.

The projections 11d, 11e ensures the plate-like structure 11 of the corresponding supporting element 5 to stably engage the bottom profile 104c of the curved support plane 104 of the curved conveyor belt 1 and the curved spar 109 of the curved conveyor belt 1.

In order to allow the plate-like structure 11 of each supporting element 5 to be mounted between the bottom profile 104c of the curved support plane 104 and the curved spar 109, the distance between the short bottom edge 11f and the short top edge 11g of such plate-like structure 11 is less than the distance between the bottom profile 104c of the curved support plane 104 and the curved spar 109.

According to the just aforementioned configuration, when the plate-like structure 11 of each supporting element 5 is mounted between the bottom profile 104c of the curved support plane 104 and the curved spar 109, the following actions are performed:
the plate-like structure 11 is laterally inclined to be able to occupy the space between the bottom profile 104c of the curved support plane 104 and the curved spar 109;
the long projection 11d of the short bottom edge 11f of the plate-like structure 11 is firstly brought in correspondence of the corresponding engagement seat 104d of the bottom profile 104c of the curved support plane 104 and, secondly, at least partially inserted in to such engagement seat 104d;
the plate-like structure 11 is straightened in order to allow the long projection 11d of the short bottom edge 11f to insert into the corresponding engagement seat 104d of the bottom profile 104c of the curved support plane 104, and the short projections 11e of the short top edge 11g to be aligned to the corresponding engagement seats 109e of the curved spar 109;
the plate-like structure 11 is raised to determine the short projections 11e of the short top edge 11g to insert into the corresponding engagement seats 109e of the curved spar 109, until the short top edge 11g is placed against the lower surface 109a of the curved spar 109;
the plate-like structure 11 is locked at this final position.

In order to lock the plate-like structure 11 of each supporting element 5 between the bottom profile 104c of the curved support plane 104 and the curved spar 109 as the aforementioned final position, as shown in FIG. 15, the plate-like structure 11 comprises a locking and adjusting mechanism 28 operatively placed at the corresponding short top edge 11g, optionally between the corresponding short projections 11e.

In particular, the locking and adjusting mechanism 28 comprises at least one threaded nut 28a housed into a corresponding housing seat 11h made in the corresponding short top edge 11g of the corresponding plate-like structure 11 and at least one threaded screw 28b or similar threaded element screwable into the threaded nut 28a through a corresponding through hole 109b made in the lower surface 109a of the curved spar 109.

The cooperation between the threaded screw 28b, the threaded nut 28a and the lower surface 109a of the curved spar 109, raising the corresponding plate-like structure 11, by inserting the short projections 11e into the corresponding engagement seats 109e of the curved spar 109, until the short top edge 11g is placed against the lower surface 109a of the curved spar 109 and the plate-like structure 11 is locked.

Advantageously, in order to allow the threaded screw 28b be inserted into or removed from the threaded nut 28a when the corresponding plate-like structure 11 of the corresponding supporting element 5 is at the right position to be locked or unlocked, the curved spar 109 comprises a through access hole 109c, preferably larger than the through hole 109b of the lower surface 109a of the curved spar 109 and aligned to such through hole 109b, made in an upper portion 109d of the curved spar 109.

Figure 26:
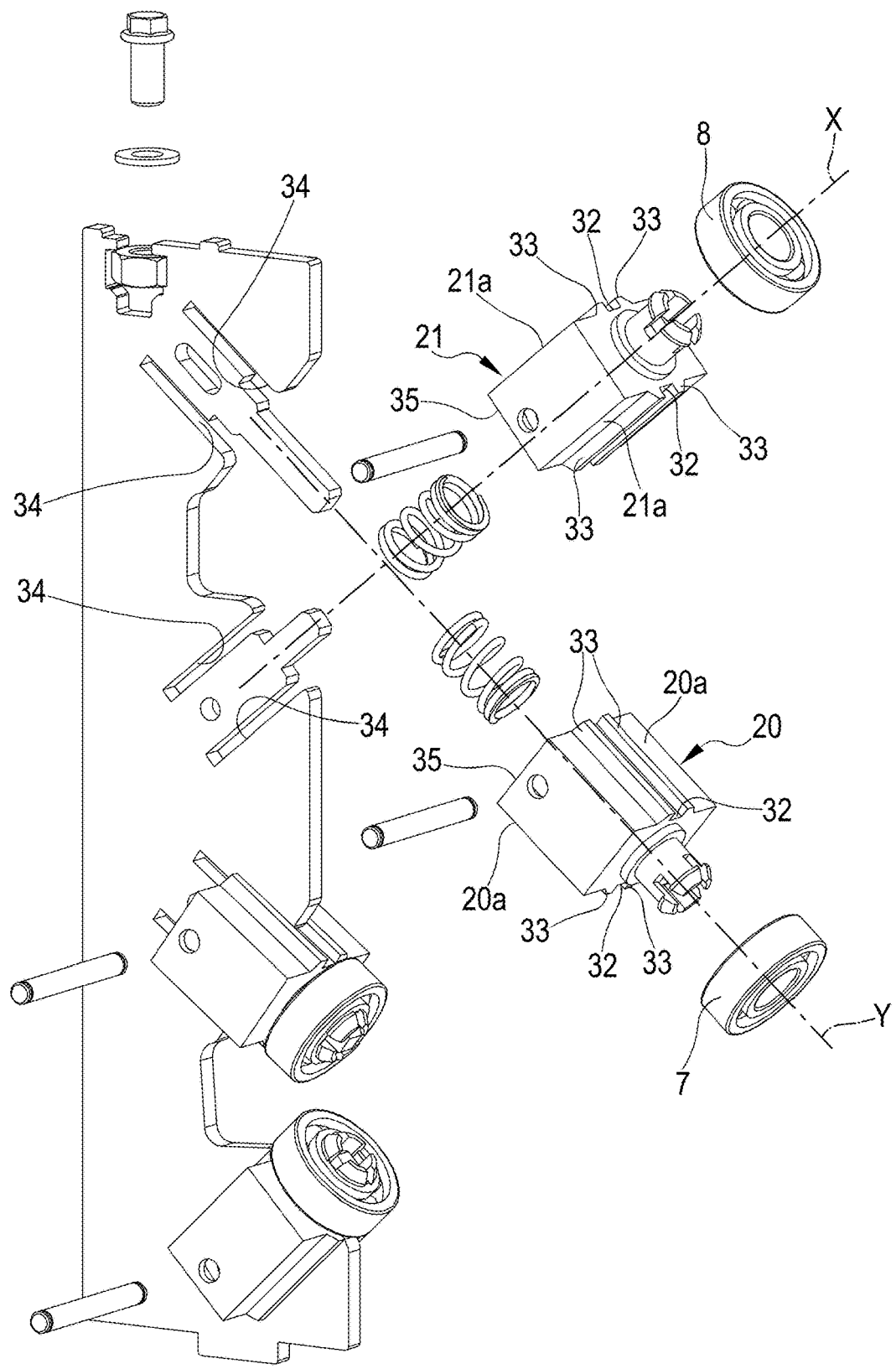
FIG. 26 is a perspective view, at least partially exploded, of a further embodiment of the element shown in FIGS. 5 to 9 and 15.

According to the embodiment shown in FIG. 26, such a solution differs from the one shown in FIGS. 5 to 11, and 15 in that the roller holders 20, 21 are provided with corresponding engaging walls 20a, 21a different in shape and/or structure.

In particular, each engaging wall 20a, 21a of each roller holder 20, 21 is provided with at least one guiding recess 32 engageable by a corresponding guiding edge 34 of the plate-like structure 11 of the corresponding supporting element 5 to maintain the corresponding roller 7, 8 aligned with the corresponding supporting protrusion 11a, 11b.

As shown in FIG. 26, each guiding recess 32 of each roller holder 20, 21 is parallel to the longitudinal axis, Y, X of the corresponding roller 7, 8.

Each guiding recess 32 of each roller holder 20, 21 lies on the same median plane of the corresponding roller 7, 8, optionally on the same median plane of the plate like-structure. Each guiding recess 32 of each roller holder 20, 21 lies on the same median plane where the longitudinal axis Y, X of the corresponding roller 7, 8 lies.

More in detail, each guiding recess 32 of each roller holder 20, 21 is defined by at least two guiding ribs 33 externally projecting from the corresponding engaging wall 20a, 21a and developing in parallel with each other and with the longitudinal axis Y, X of the corresponding roller 7, 8. The corresponding guiding edge 34 of the plate like structure 11 of the corresponding supporting element 5 is interposed between the corresponding guiding ribs 33 whereby each guiding edge 34 remains constrained between the corresponding guiding ribs 33 constituting a stable assembly able to maintain its proper position regardless of the stresses to which they are subjected to.

As can be seen in FIG. 26, the guiding ribs 33 of each guiding recess 32 of each roller holder 20, 21 develop along the entire length of the corresponding roller holder 20, 21, between the corresponding roller 7, 8 and a corresponding bottom edge 35 facing away from the corresponding roller 7, 8.

With reference to the embodiments shown in FIGS. 16 to 25 each supporting element 5 of the curved belt conveyor 1 comprises a U-shaped profile 24, comprising at least one central portion 25 and a pair of opposed wings 26 developing from the central portion 25, particularly substantially parallel each other and orthogonal with respect to the central portion 25.

Preferably, the U-shaped profile 24 of each supporting element 5 is made in one piece. However, it has to be noted that, the U-shaped profile 24 of each supporting element 5 can also be made by different pieces properly engaged each other to constitute a stably body.

Advantageously, at least one guiding element 27 is operatively interposed between the U-shaped profile 24 of the corresponding supporting element 5 and the corresponding main roller 7 of the corresponding pair of rollers 4 to allow such main roller 7 to move between the releasing position and the retaining position.

In particular, two opposed guiding elements 27 are operatively interposed between the corresponding opposed wings 26 of the corresponding U-shaped profile 24 of the corresponding supporting element 5 and the corresponding main roller 7 of the corresponding pair of rollers 4 to allow such main roller 7 to move between the releasing position and the retaining position.

More in detail, each guiding element 27 comprises at least one guiding slot 27a, optionally two parallel guiding slots 27a, made in each wing 26 of the corresponding U-shaped profile 24 of the corresponding supporting element 5, and at least one guiding rib 27b, optionally two parallel guiding ribs 27b, protruding from a corresponding engaging wall 20a of the corresponding roller holder 20 of the corresponding main roller 7 of the corresponding pair of rollers 4. Preferably, each guiding rib 27b of the roller holder 20 of the corresponding main roller 7 is slidably engaged in the corresponding guiding slot 27a of the corresponding wing 26 of the corresponding U-shaped profile 24 of the corresponding supporting element 5 to allow the main roller 7 to move between the releasing position and the retaining position.

In order to allow the main roller 7 of the corresponding pair of rollers 4 of the corresponding supporting element 5 to move between the releasing position and the retaining position, each corresponding guiding slot 27a is longer than the corresponding guiding rib 27b. The difference in length between each guiding slot 27a and the corresponding guiding rib 27b determines the extent of excursion of the movement of the corresponding main roller 7 between the releasing position and the retaining position.

Figure 23:
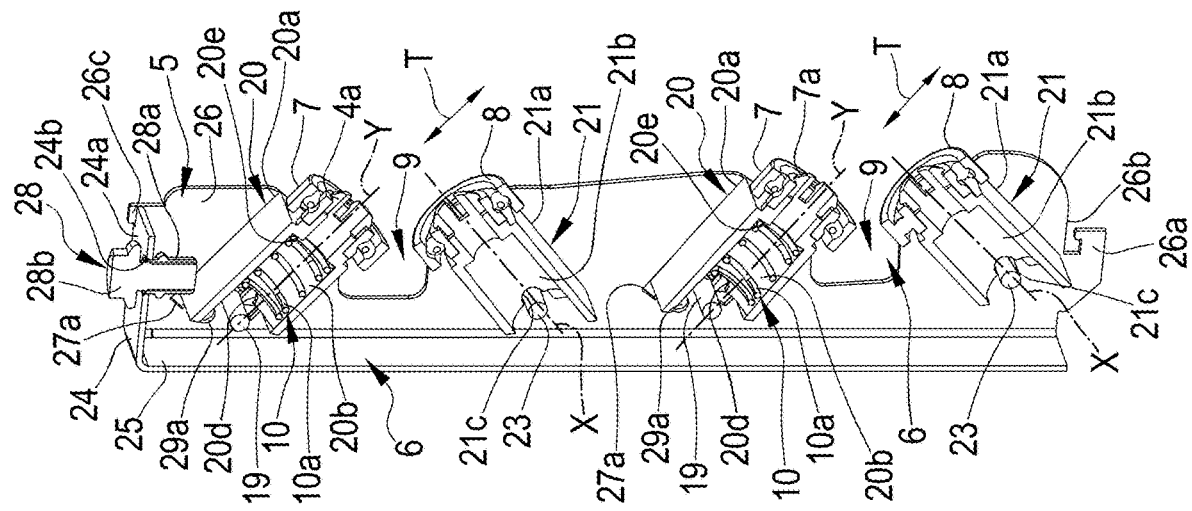
FIG. 23 is a perspective view of a cross-section of the element shown in FIGS. 20 and 21, executed along a median plane of the element shown in FIGS. 20 and 21.
Figure 25:
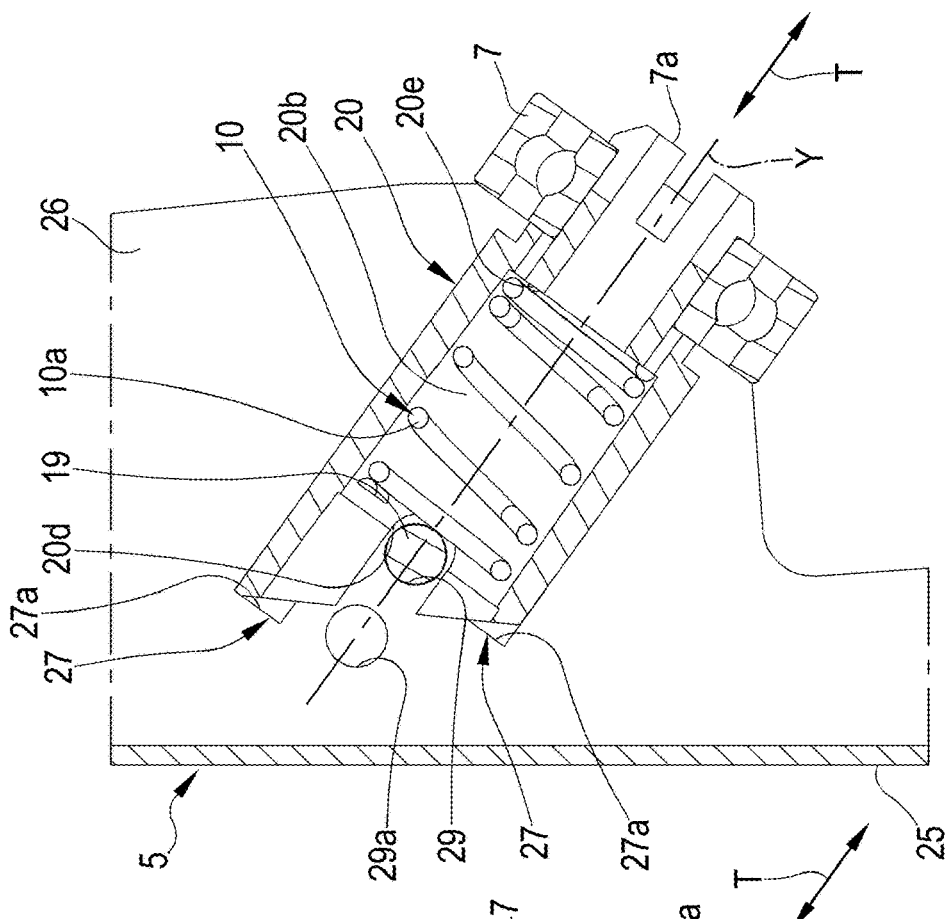
FIG. 25 is a second cross-section view of the detail of the element shown in FIG. 24, drawn in a position different with respect to the position shown in FIG. 24.
Figure 24:
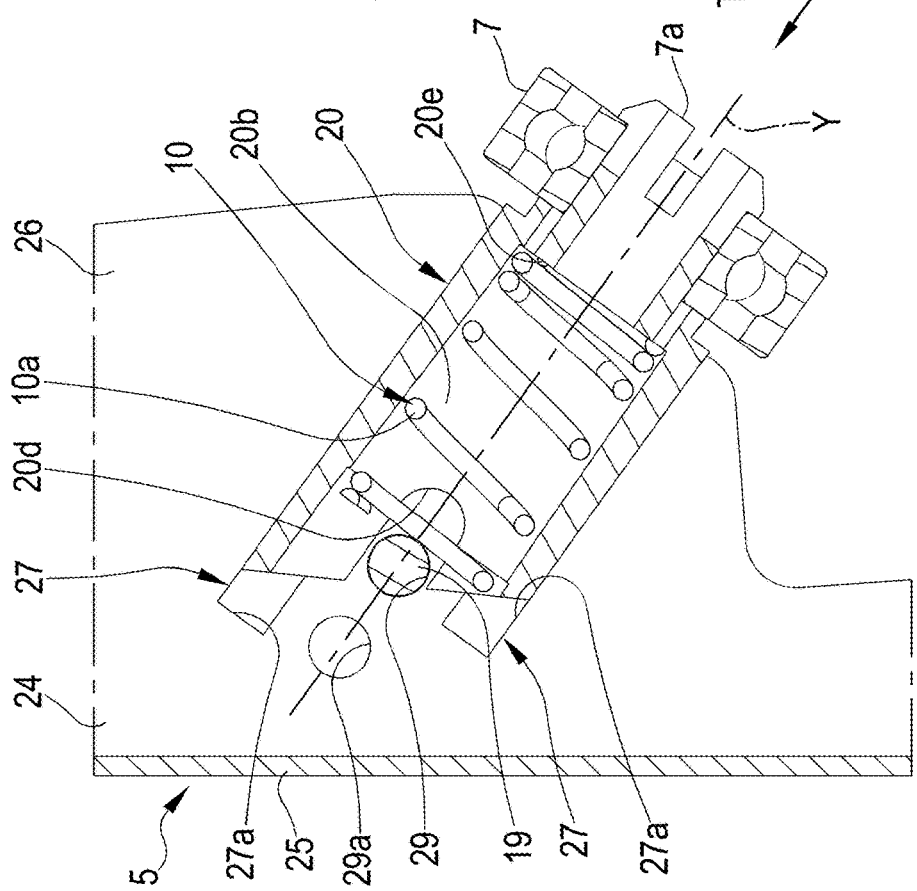
FIG. 24 is a first cross-section view of a detail of the element shown in FIGS. 20 and 21.

As shown in FIGS. 23 to 25, the roller holder 20 of the corresponding main roller 7 of each pair of rollers 4 of the corresponding U-shaped profile 24 of each supporting element 5 also comprises a sleeve portion 20 connected to least one of the engaging wall 20a, optionally tangentially joined to two opposite engaging walls 20a.

At the opposite side of the main roller 7 of each pair of rollers 4 of the corresponding U-shaped profile 24 of each supporting element 5, the corresponding engaging walls 20a and the corresponding sleeve portion 20b are provided with at least one seat 20c, 20d to lean on a corresponding connection rod 19 engageable on the corresponding U-shaped profile 24, particularly on a portion of the corresponding connection rod 19 interposed between the opposed wings 26 of the corresponding U-shaped profile 24.

As shown in FIGS. 20 to 25, each of the opposed wings 26 of the corresponding U-shaped profile 24 of each supporting element 5 is provided with at least one through hole 29 engageable by a corresponding connection rod 19 which is able to interact with the roller holder 20 of the corresponding main roller 7 of the corresponding pair of rollers 4. The through holes 29 are aligned substantially along a direction perpendicular to the opposed wings 26.

The through hole 29 of each opposed wing 26 is placed between the guiding slots 27a of the corresponding guiding element 27, preferably near the central portion 25 of the corresponding U-shaped profile 24 of the corresponding supporting element 5. Moreover, each of the opposed wings 26 of the corresponding U-shaped profile 24 of the corresponding supporting element 5 is provided with at least one additional through hole 29 engageable by the corresponding connection rod 19. Also the additional through holes 29a are aligned substantially along a direction perpendicular to the corresponding opposed wings 26 different to the alignment direction of the through holes 29 so that to allow the connection rod 19 to change its position by changing its way to interact with the roller holder 20 of the corresponding main roller 7.

As can be seen in FIGS. 20 to 22, 24 and 25, the additional through hole 29a of each opposed wing 26 is interposed between the corresponding central portion 25 of the corresponding U-shaped profile 24 and the corresponding through hole 29. The position of the connection rod 19 can be changed between the through holes 29 and the additional through holes 29a to adjust the end stroke of the roller holder 20 of the corresponding main roller 7 and, therefore, the position of the releasing position.

As visible in FIGS. 23 to 25, the elastic element 10 of the main roller 7 is at least partially housed inside the sleeve portion 20a of the roller holder 20 of the corresponding main roller 7, particularly between the connection rod 19 and a corresponding abutment portion 20e of the roller holder 20 of the main roller 7. The position of the connection rod 19 determines the spring preload force of the elastic element 10. When the connection rod 19 is engaged to the through holes 29 the spring preloaded force of the elastic element 10 is higher than the spring preloaded force of the same when the connection rod 19 is engaged to the additional through holes 29a.

Figure 20:
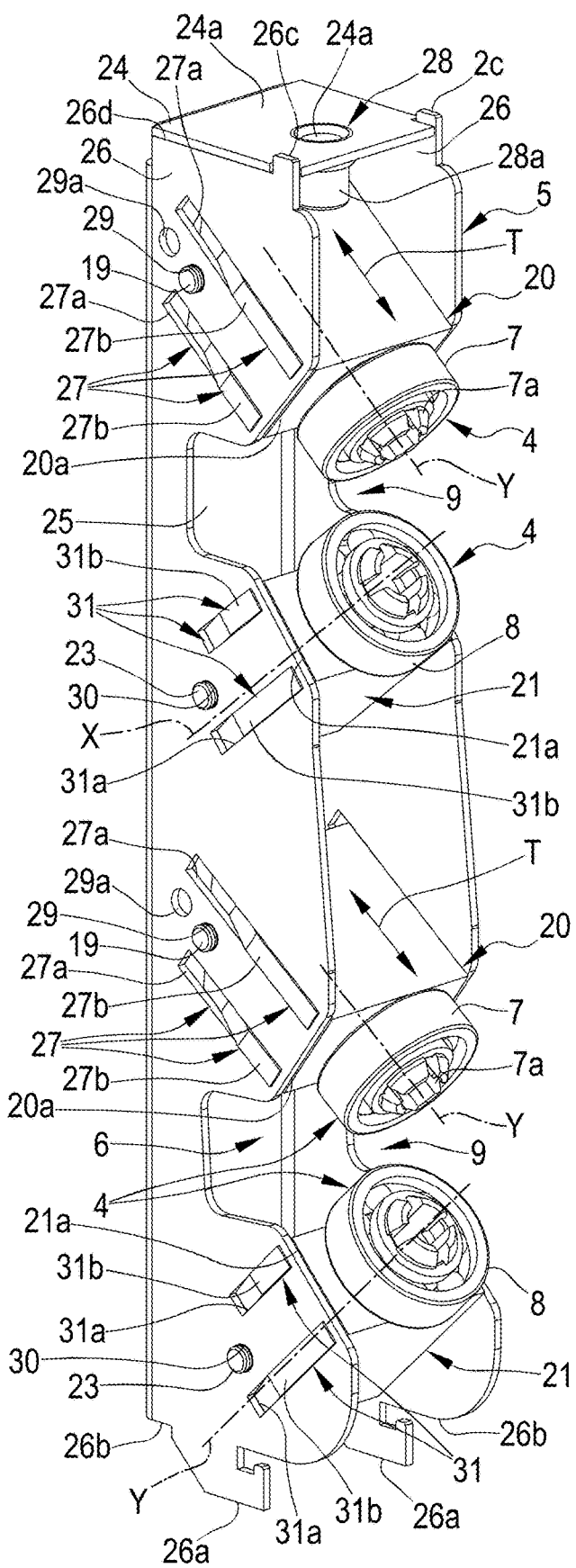
FIG. 20 is a perspective view of an element of the curved belt conveyor shown in FIGS. 16 to 19.
Figure 21:
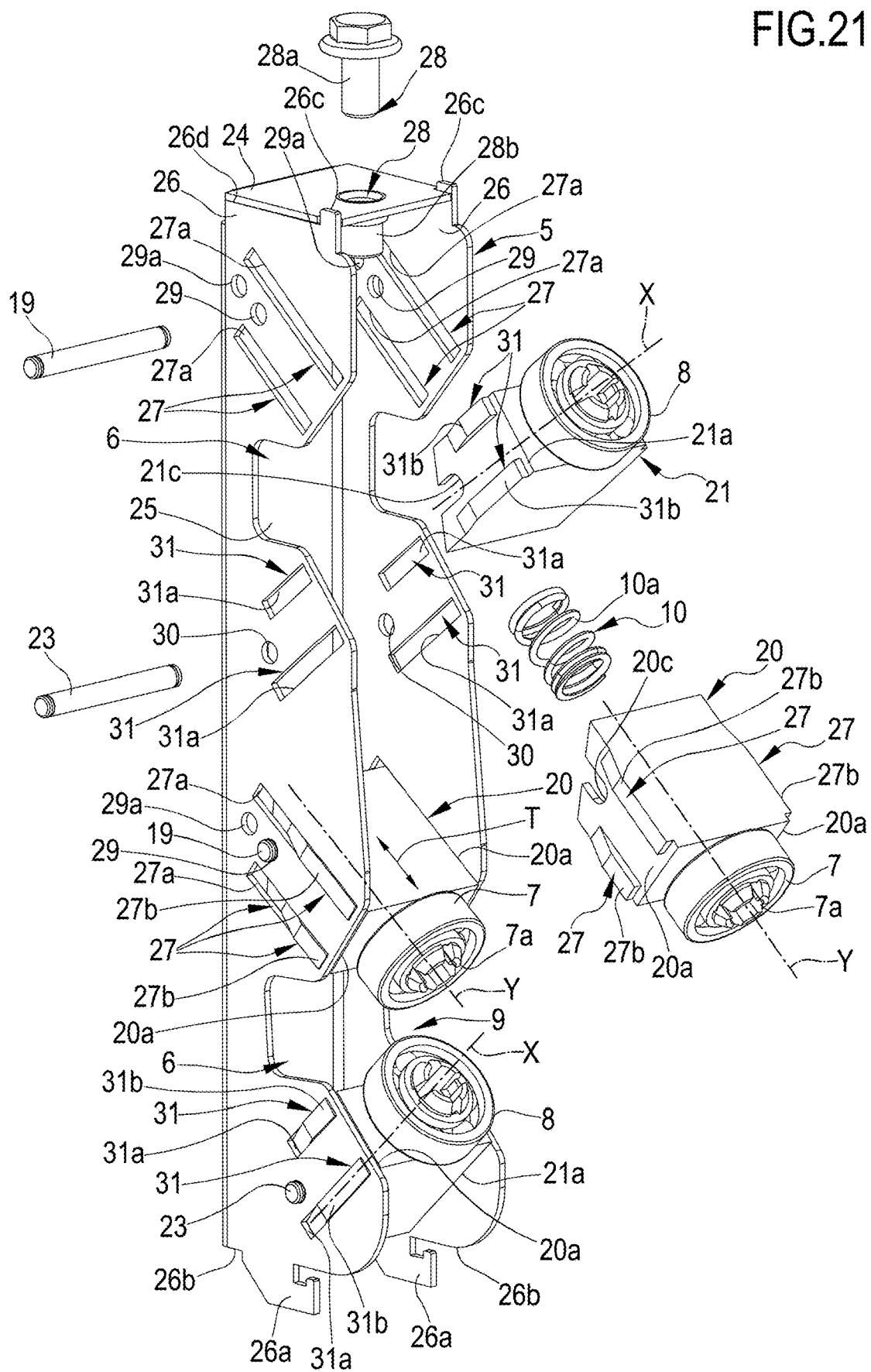
FIG. 21 is a perspective view, at least partially exploded, of the element shown in FIG. 20.

Always with reference to FIGS. 20 and 21, the U-shaped profile 24 of each supporting element 5 comprises at least one joining element 31, preferably two, operatively interposed between the corresponding opposed wings 26 of the U-shaped profile 24 of the corresponding supporting element 5 and the corresponding auxiliary roller 8. In particular, each joining element 31 comprises at least one joining slot 31a, optionally two parallel joining slots 31a, made in each opposed wing 26 of the corresponding U-shaped profile 24 of the corresponding supporting element 5, and at least one joining rib 31b, optionally two parallel joining ribs 31b, protruding from a corresponding engaging wall 21a of the corresponding roller holder 21 of the corresponding auxiliary roller 8 of the corresponding pair of rollers 4. Each joining rib 31b of the roller holder 21 of the corresponding auxiliary roller 8 fits into the corresponding joining slot 31a of the corresponding joining element 31 so that the roller holder 21 of the corresponding auxiliary roller 8 cannot move with respect to the opposed wings 26 of the corresponding U-shaped profile 24.

Figure 22:
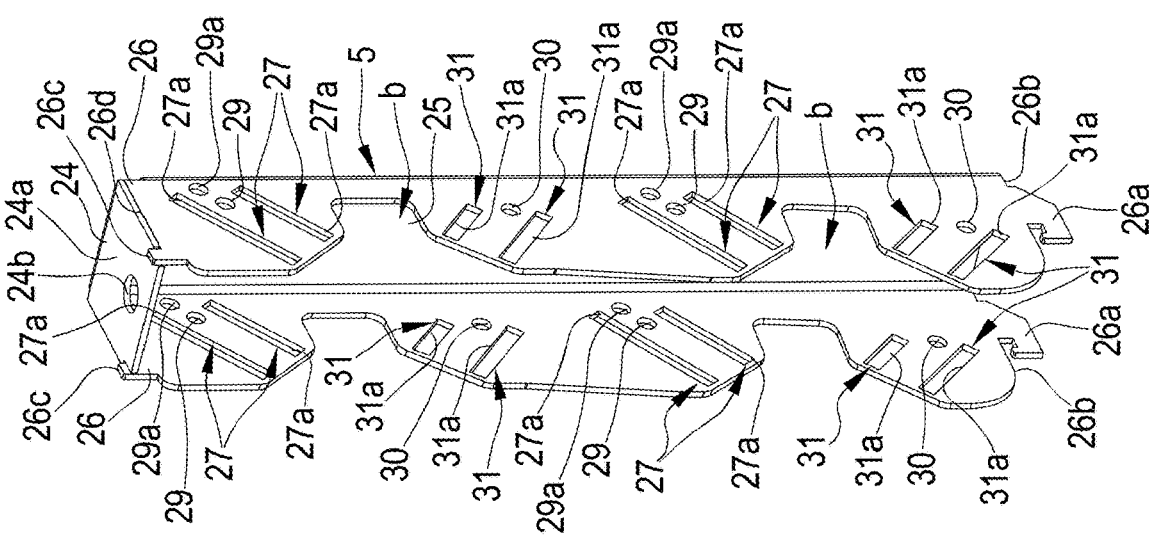
FIG. 22 is a perspective view of a U-shaped profile of the element shown in FIGS. 20 and 21.

As shown in FIGS. 20 to 22, each of the opposed wings 26 of the corresponding U-shaped profile 24 of each supporting element 5 is provided with at least one further through hole 30 engageable by a corresponding connection bar 23 on which the roller holder 21 of the corresponding auxiliary roller 8 of the corresponding pair of rollers 4 leans. The further through holes 30 are aligned substantially along a direction perpendicular to the opposed wings 26.

Moreover, the further through hole 30 of each opposed wing 26 of the U-shaped profile 24 of the corresponding supporting element 5 is placed between the joining slots 31a of the corresponding joining element 31, preferably near the central portion 25 of the corresponding U-shaped profile 24 of the corresponding supporting element 5.

Similarly to the roller holder 20 of the corresponding main roller 7 of the corresponding pair of rollers 4, the roller holder 21 of the corresponding auxiliary roller 8 of the same pair of rollers 4 provides, at the opposite side of the auxiliary roller 8, at least one seat 21c to lean on the corresponding connection bar 23, particularly on a portion of the corresponding connection bar 23 interposed between the corresponding opposed wings 26 of the corresponding U-shaped profile 24.

With reference to FIGS. 20 to 23, the U-shaped profile 24 of each supporting element 5 comprises at least one couple of hooking projections 26a, each of them developing respectively from a corresponding bottom edge 26b of the corresponding opposed wing 26. Moreover, the U-shaped profile 24 of each supporting element 5 comprises at least one couple of short projections 26c, each of them developing from a corresponding top edge 26d of the corresponding opposed wing 26. The hooking projections 26a and the short projections 26c ensure the U-shaped profile 24 of the corresponding supporting element 5 to stably engage the bottom profile 104c of the curved support plane 104 and the curved spar 109 of the curved conveyor belt 1.

The hooking projections 26a and the short projections 26 of the U-shaped profile 24 of the corresponding supporting element 5 are arranged to engage corresponding seats (not shown in the attached figures) made in the bottom profile 104c of the curved support plane 104 and in the curved spar 109 of the curved conveyor belt 1.

In much the same way as the plate-like structure 11 of each supporting element according to the embodiment shown in FIGS. 5 to 15, in order to lock the U-shaped profile 24 of each supporting element 5 between the bottom profile 104c of the curved support plane 104 and the curved spar 109, the U-shaped profile 24 comprises a locking and adjusting mechanism 28 operatively placed at a top wall 24a of the U-shaped profile 24, substantially orthogonal to the central portion 25 and the opposed wings 26.

In particular, the locking and adjusting mechanism 28 comprises at least one threaded nut 28a housed into a corresponding housing hole 24b made in the corresponding top wall 24a of the corresponding U-shaped profile 24 and at least one threaded screw 28b or similar threaded element screwable into the threaded nut 28a through a corresponding through hole (not shown in the attached figures) made in the lower surface 109a of the curved spar 109. The cooperation between the threaded screw 28b, the threaded nut 28a and the lower surface 109a of the curved spar 109, raising the corresponding U-shaped profile 24 by locking this latter between the curved spar 109 and the bottom profile 104c of the curved support plane 104.

Advantageously, in order to allow the threaded screw 28b be inserted into or removed from the threaded nut 28a when the corresponding U-shaped profile 24 is at the right position to be locked or unlocked, the curved spar 109 comprises a through access hole 109c, preferably larger than the corresponding through hole of the lower surface 109a of the curved spar 109 and aligned to such through hole, made in the upper portion 109d of the curved spar 109.

The invention claimed is:

1. A curved belt conveyor comprising:
    a conveyor belt comprising a hooking element associated with an outer periphery of the conveyor belt;
    a plurality of pair of rollers guiding the hooking element of the conveyor belt;
    a plurality of supporting elements placed in correspondence of the outer periphery of the conveyor belt each for supporting at least one pair of rollers, at least a holding space for the hooking element of the conveyor belt being defined among each pair of rollers and the corresponding supporting element;
    wherein
    at least one main roller of at least one pair of rollers of each supporting element is movable along a trajectory extending only along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, the trajectory of a movement of the main roller of the corresponding pair of rollers of each supporting element between the releasing position and the retaining position is not a rotation or a pivotable movement around a rotational axis and is not a transverse translational movement with respect to the corresponding rotation axis and the main roller shaft of the main roller.

2. A curved belt conveyor according to claim 1, wherein the rollers of each supporting element prevent the hooking element of the conveyor belt to move from the corresponding holding space through the corresponding intermediate space when the main roller is placed at the retaining position.

3. A curved belt conveyor according to claim 1, wherein when the main roller of the corresponding pair of rollers of each supporting element is placed at the retaining position, the rollers oppose any movement of the hooking element of the conveyor belt from the corresponding holding space through the corresponding intermediate space.

4. A curved belt conveyor according to claim 1, wherein the trajectory of a movement of the main roller of the corresponding pair of rollers of each supporting element between the releasing position and the retaining position is inclined with respect to a longitudinal axis of an auxiliary roller of the same pair of rollers, the main roller of the corresponding pair of rollers of each supporting element converging to the longitudinal axis of the corresponding auxiliary roller of the same pair of rollers from the releasing position to the retaining position.

5. A curved belt conveyor according to claim 1, wherein a trajectory of a movement of the main roller of the corresponding pair of rollers of each supporting element between the releasing position and the retaining position is substantially rectilinear.

6. A curved belt conveyor according to claim 1, wherein the main roller of the corresponding pair of rollers of each supporting element is provided with at least one elastic element adapted to move the main roller towards the retaining position, wherein the elastic element is operatively interposed between the main roller of the corresponding pair of rollers of each supporting element and the corresponding supporting element, the elastic element opposing a movement of the main roller of the corresponding pair of rollers of each supporting element from the retaining position to the releasing position and pushing the main roller of the corresponding pair of rollers of each supporting element from the releasing position to the retaining position when no force towards the releasing position is applied on the corresponding main roller or no force equal or higher than the push of the elastic element towards the releasing position is applied on the corresponding main roller.

7. A curved belt conveyor according to claim 1, wherein each supporting element comprises a plate-like structure, wherein the plate-like structure of each supporting element is made in one piece or is made by two or more plates joined together according to a superimposed relation so that to substantially form a single body.

8. A curved belt conveyor according to claim 7, wherein the plate-like structure of each supporting element is aligned to corresponding longitudinal axis of the rollers of the corresponding pair of rollers.

9. A curved belt conveyor according to claim 7, the plate-like structure of each supporting element is placed and/or lies on a median plane of each roller of the corresponding pair of rollers.

10. A curved belt conveyor according to claim 7, wherein the plate-like structure of each supporting element is provided with at least one pair of supporting protrusions for supporting the corresponding rollers of the corresponding pair or rollers, wherein the supporting protrusions develop, at least partially cantilevered, from one portion of the plate-like structure of the corresponding supporting element.

11. A curved belt conveyor according to the previous claim 10, wherein the supporting protrusions are defined at least partially into a corresponding concavity made in one side of the corresponding plate-like structure of the corresponding supporting element, the concavity made in the plate-like structure of the corresponding supporting element comprising:
  a main peripheral portion from which a corresponding main supporting protrusion develops cantilevered for supporting the main roller of the corresponding pair of rollers of the corresponding supporting element, the main roller of the corresponding pair of rollers of the corresponding supporting element being mobile along the corresponding main supporting protrusion between the releasing position and the retaining position;
  an auxiliary peripheral portion placed at the opposite side of a central portion, facing at least partially the main peripheral portion, from which a corresponding auxiliary supporting protrusion develops cantilevered for supporting an auxiliary roller of the corresponding pair of rollers of the corresponding supporting element.

12. A curved belt conveyor according to claim 11, wherein the holding space is at least partially defined by a corresponding concavity of the corresponding plate-like structure of the corresponding supporting element, the holding space being at least partially defined in the corresponding concavity of the corresponding plate-like structure of the corresponding supporting element among the corresponding central portion of such a concavity and the corresponding rollers of the corresponding pair of rollers engaged on the corresponding protrusions of the corresponding plate-like structure of the corresponding supporting element, and wherein each supporting protrusion is at least partially defined in the corresponding plate-like structure of the corresponding supporting element by at least one groove made in the plate-like structure, by a couple of grooves developing side by side the corresponding supporting protrusion, substantially parallel each other, and the supporting protrusion being interposed between the grooves of the corresponding couple of grooves, each supporting protrusion comprising an elongated body wider towards the corresponding plate-like structure of the supporting element and narrower towards the side opposite the corresponding plate-like structure of the corresponding plate-like structure.

13. A curved belt conveyor according to claim 12, wherein the elongated body of each supporting protrusion comprises:
  a joining portion connected to the corresponding plate-like structure of the corresponding supporting element;
  a free end portion faced towards the side opposite the corresponding plate-like structure of the corresponding supporting element, the joining portion being wider than the free end portion and being connected each other by at least one step portion, wherein the free end portion of the main supporting protrusion is longer than the free end portion of the auxiliary supporting protrusion, the joining portion of the auxiliary supporting protrusion being longer than the joining portion of the main supporting protrusion.

14. A curved belt conveyor according to claim 12, wherein each roller of the corresponding pair of rollers of each supporting element comprises a roller holder having:
  at least one couple of engaging walls engaging the corresponding couple of grooves made in the corresponding plate-like structure of the corresponding supporting element;
  at least one sleeve portion at least indirectly connected to at least one engaging wall fitted on the corresponding supporting protrusion of corresponding plate-like structure of the corresponding supporting element, the engaging walls and the sleeve portion of the roller holder of the main roller being respectively guided by corresponding grooves and the corresponding main supporting protrusion of the corresponding plate-like structure of the corresponding supporting element between the releasing position and the retaining position of the main roller, wherein an elastic element of the main roller is fitted on the corresponding main supporting protrusion between this latter and/or the corresponding plate-like structure of the corresponding supporting element and the corresponding sleeve portion of the main roller, the elastic element being at least partially housed inside the sleeve portion of the roller holder of the main roller.

15. A curved belt conveyor according to claim 14, wherein each engaging wall of each roller holder is provided with at least one guiding recess engageable by a corresponding guiding edge of the plate-like structure of the supporting element to maintain the corresponding roller aligned with the corresponding supporting protrusion, each guiding recess of each roller holder being defined by at least two guiding ribs externally projecting from the corresponding engaging wall and developing in parallel with each other and with a longitudinal axis of the corresponding roller and the corresponding guiding edge of the plate like structure of the corresponding supporting element being interposed between the corresponding guiding ribs.

16. A curved belt conveyor according to claim 10, wherein the main supporting protrusion of the corresponding plate-like structure of the corresponding supporting element is provided with at least one through buttonhole developing substantially parallel the longitudinal development of the main supporting protrusion, a length of the through buttonhole determining an extent of an excursion of a movement of the corresponding main roller between the releasing position and the retaining position, the through buttonhole being made in an joining portion of the corresponding main supporting protrusion of the corresponding plate-like structure of the corresponding supporting element,
   wherein a connection rod which connects the main supporting protrusion and the main roller crosses the through buttonhole of the corresponding main supporting protrusion of the corresponding plate-like structure of the corresponding supporting element, the connection rod being free to move along the corresponding through buttonhole of the corresponding joining portion of the corresponding main supporting protrusion between the buttonhole opposite ends to allow the movement of the corresponding main roller between the releasing position and the retaining position.

17. A curved belt conveyor according to claim 7, wherein the plate-like structure of each supporting element comprises at least one projection developing respectively from a short bottom edge and a short top edge, wherein:
   the short bottom edge of the plate-like structure of each supporting element provides a long projection placed close to a middle point of the short bottom edge;
   the short top edge of the same plate-like structure provides two short projections, one placed at a corner of the plate-like structure opposite the rollers of the corresponding pair of rollers, and the other short top edge placed close to or at a middle point of the short top edge,
   the long projection of the short bottom edge of the plate-like structure of each supporting element is arranged to be inserted into a corresponding engagement seat made in a bottom profile engaged on an upper surface of a curved support plane of the conveyor belt;
   the short projections are arranged to be inserted into corresponding engagement seats made in a lower surface of a curved spar of the curved conveyor belt, wherein a distance between the short bottom edge and the short top edge of the corresponding plate-like structure of each supporting element is less than a distance between the bottom profile of the curved support plane and the curved spar.

18. A curved belt conveyor comprising:
   a conveyor belt comprising a hooking element associated with an outer periphery of the conveyor belt;
   a plurality of pair of rollers guiding the hooking element of the conveyor belt;
   a plurality of supporting elements placed in correspondence of the outer periphery of the conveyor belt each for supporting at least one pair of rollers, at least a holding space for the hooking element of the conveyor belt being defined among each pair of rollers and the corresponding supporting element;
   wherein
   at least one main roller of at least one pair of rollers of each supporting element is movable along a rectilinear trajectory extending along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, a movement of the main roller from the retaining position to the releasing position is defined by a rectilinear translation of the main roller along the corresponding longitudinal axis approaching the corresponding supporting element and moving away from a longitudinal axis of the other roller of the corresponding pair of rollers, whereas movement of the main roller from the releasing position to the retaining position is defined by rectilinear translation along the corresponding longitudinal axis, in an opposite direction, moving away from the corresponding supporting element and approaching the longitudinal axis of the other roller of the corresponding pair of rollers.

19. A retaining element for a curved belt conveyor comprising:
   at least one pair of rollers for guiding a hooking element of a conveyor belt;
   a supporting element for supporting the at least one pair of rollers, at least a holding space for the hooking element of the conveyor belt being defined among the at least one pair of rollers and the supporting element;
   wherein
   the supporting element comprises a plate-like structure aligned to corresponding longitudinal axis of the rollers of the corresponding pair of rollers, the plate-like structure being placed and lying on a median plane of each roller of the at least one pair of rollers;
   at least one main roller of at least one pair of rollers is movable along a trajectory between a releasing position, wherein the rollers are distant from each other defining a corresponding intermediate space allowing passage of the hooking element of the conveyor belt to and/or from the corresponding holding space, and a retaining position, wherein the rollers are close to each other so that the corresponding intermediate space does not allow passage of the hooking element of the conveyor belt at least from the corresponding holding space through the corresponding intermediate space;
   the trajectory substantially lying on the median plane of each roller and being in either rectilinear or curved, for example an arc of a circle.

20. A curved belt conveyor comprising:
   a conveyor belt comprising a hooking element associated with an outer periphery of the conveyor belt;
   a plurality of pair of rollers guiding the hooking element of the conveyor belt;
   a plurality of supporting elements placed in correspondence of the outer periphery of the conveyor belt each for supporting at least one pair of rollers, at least a holding space for the hooking element of the conveyor belt being defined among each pair of rollers and the corresponding supporting element;
   wherein
   at least one main roller of at least one pair of rollers of each supporting element is movable along a trajectory extending along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, wherein the main roller of the corresponding pair of rollers of each supporting element is provided with at least one elastic element adapted to move the main roller towards the retaining position, wherein the elastic element is operatively interposed between the main roller of the corresponding pair of rollers of each supporting element and the corresponding supporting element, the elastic element opposing a movement of the main roller of the corresponding pair of rollers of each supporting element from the retaining position to the releasing position and pushing the main roller of the corresponding pair of rollers of each supporting element from the releasing position to the retaining position when no force towards the releasing position is applied on the corresponding main roller or no force equal or higher than the push of the elastic element towards the releasing position is applied on the corresponding main roller.

21. A curved belt conveyor comprising:
a conveyor belt comprising a hooking element associated with an outer periphery of the conveyor belt;
a plurality of pair of rollers guiding the hooking element of the conveyor belt;
a plurality of supporting elements placed in correspondence of the outer periphery of the conveyor belt each for supporting at least one pair of rollers, at least a holding space for the hooking element of the conveyor belt being defined among each pair of rollers and the corresponding supporting element;
wherein
at least one main roller of at least one pair of rollers of each supporting element is movable along a trajectory extending along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, wherein each supporting element comprises a plate-like structure aligned to a corresponding longitudinal axis of the rollers of the corresponding pair of rollers, wherein the plate-like structure of each supporting element is made in one piece or is made by two or more plates joined together according to a superimposed relation so that to substantially form a single body.

22. A curved belt conveyor comprising:
a conveyor belt comprising a hooking element associated with an outer periphery of the conveyor belt;
a plurality of pair of rollers guiding the hooking element of the conveyor belt;
a plurality of supporting elements placed in correspondence of the outer periphery of the conveyor belt each for supporting at least one pair of rollers, at least a holding space for the hooking element of the conveyor belt being defined among each pair of rollers and the corresponding supporting element;
wherein
at least one main roller of at least one pair of rollers of each supporting element is movable along a trajectory extending along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, wherein each supporting element comprises a plate-like structure, wherein the plate-like structure of each supporting element is made in one piece or is made by two or more plates joined together according to a superimposed relation so that to substantially form a single body, wherein the plate-like structure of each supporting element is aligned to corresponding longitudinal axis of the rollers of the corresponding pair of rollers and is placed and/or lies on a median plane of each roller of the corresponding pair of rollers.

23. A curved belt conveyor comprising:
a conveyor belt comprising a hooking element associated with an outer periphery of the conveyor belt;
a plurality of pair of rollers guiding the hooking element of the conveyor belt;
a plurality of supporting elements placed in correspondence of the outer periphery of the conveyor belt each for supporting at least one pair of rollers, at least a holding space for the hooking element of the conveyor belt being defined among each pair of rollers and the corresponding supporting element;
wherein
at least one main roller of at least one pair of rollers of each supporting element is movable along a trajectory extending along a rotation axis of the main roller, also extending along a longitudinal development of a corresponding main roller shaft, between a releasing position, wherein the rollers are distant from each other defining a corresponding intermediate space allowing passage of the hooking element of the conveyor belt to and/or from the corresponding holding space, and a retaining position, wherein the rollers of the corresponding pair of rollers are close to each other so that the corresponding intermediate space does not allow the passage of the hooking element of the conveyor belt at least from the corresponding holding space through the corresponding intermediate space, wherein each supporting element comprises a plate-like structure, wherein the plate-like structure of each supporting element is made in one piece or is made by two or more plates joined together according to a superimposed relation so that to substantially form a single body, wherein the plate-like structure of each supporting element is provided with at least one pair of supporting protrusions for supporting the corresponding rollers of the corresponding pair or rollers, wherein the supporting protrusions develop, at least partially cantilevered, from one portion of the plate-like structure of the corresponding supporting element.

* * * * *